United States Patent
McGill

(10) Patent No.: US 7,665,630 B2
(45) Date of Patent: Feb. 23, 2010

(54) DISPENSING APPARATUS AND METHOD FOR SEMI-SOLID PRODUCT

(75) Inventor: Shane Robert McGill, West Maling (GB)

(73) Assignee: McGill Technology Limited, Kent (GB)

( * ) Notice: Subject to any disclaimer, the term of this patent is extended or adjusted under 35 U.S.C. 154(b) by 1020 days.

(21) Appl. No.: 10/479,894

(22) PCT Filed: Jun. 17, 2002

(86) PCT No.: PCT/GB02/02772

§ 371 (c)(1),
(2), (4) Date: Apr. 14, 2005

(87) PCT Pub. No.: WO02/102170

PCT Pub. Date: Dec. 27, 2002

(65) Prior Publication Data

US 2005/0189375 A1 Sep. 1, 2005

(30) Foreign Application Priority Data

Jun. 15, 2001 (GB) .................................. 0114685.1

(51) Int. Cl.
*B67B 7/00* (2006.01)
*B65D 35/28* (2006.01)

(52) U.S. Cl. .............................. 222/1; 222/95; 222/103; 222/207; 222/214

(58) Field of Classification Search .................. 222/95, 222/103, 105, 107, 207, 212, 214, 213, 386.5, 222/252, 255, 256, 262, 267, 1

See application file for complete search history.

(56) References Cited

U.S. PATENT DOCUMENTS

| | | | | |
|---|---|---|---|---|
| 3,945,534 | A | * | 3/1976 | Ady ........................... 222/105 |
| 4,349,133 | A | * | 9/1982 | Christine .................... 222/183 |
| 4,515,294 | A | | 5/1985 | Udall |
| 4,804,188 | A | * | 2/1989 | McKee et al. ................ 473/342 |
| 5,413,252 | A | | 5/1995 | Magnus |
| 5,918,767 | A | | 7/1999 | McGill |
| 6,016,935 | A | * | 1/2000 | Huegerich et al. ......... 222/146.1 |
| 6,142,343 | A | * | 11/2000 | Wade et al. .................. 222/182 |
| 6,419,121 | B1 | * | 7/2002 | Gutierrez et al. .......... 222/146.5 |

FOREIGN PATENT DOCUMENTS

| | | |
|---|---|---|
| DE | 521 761 | 3/1931 |
| DE | 37 09 161 | 10/1987 |
| EP | 0 105 771 | 4/1984 |
| EP | 0 919 134 | 6/1999 |
| EP | 1 095 901 | 5/2001 |
| WO | WO 97 42096 | 11/1997 |
| WO | WO 01 30176 | 5/2001 |
| WO | WO 01 60173 | 8/2001 |

* cited by examiner

*Primary Examiner*—Kevin P Shaver
*Assistant Examiner*—Stephanie E Tyler
(74) *Attorney, Agent, or Firm*—Nixon & Vanderhye P.C.

(57) ABSTRACT

Dispensing apparatus is primarily intended for dispensing product from product containers (12) by extrusion. In controlling discharge of product a flexible tube (25) is connected to the container outlet and the tube is engageable with drive means (29, 31) for deforming the tube and controlling product discharged along the tube to an outlet nozzle (26). Usually there will be valves towards the entry (27) and exit (28) of the flexible tube and the drive means engages the tube between the spaced positions.

17 Claims, 23 Drawing Sheets

Figure 1:
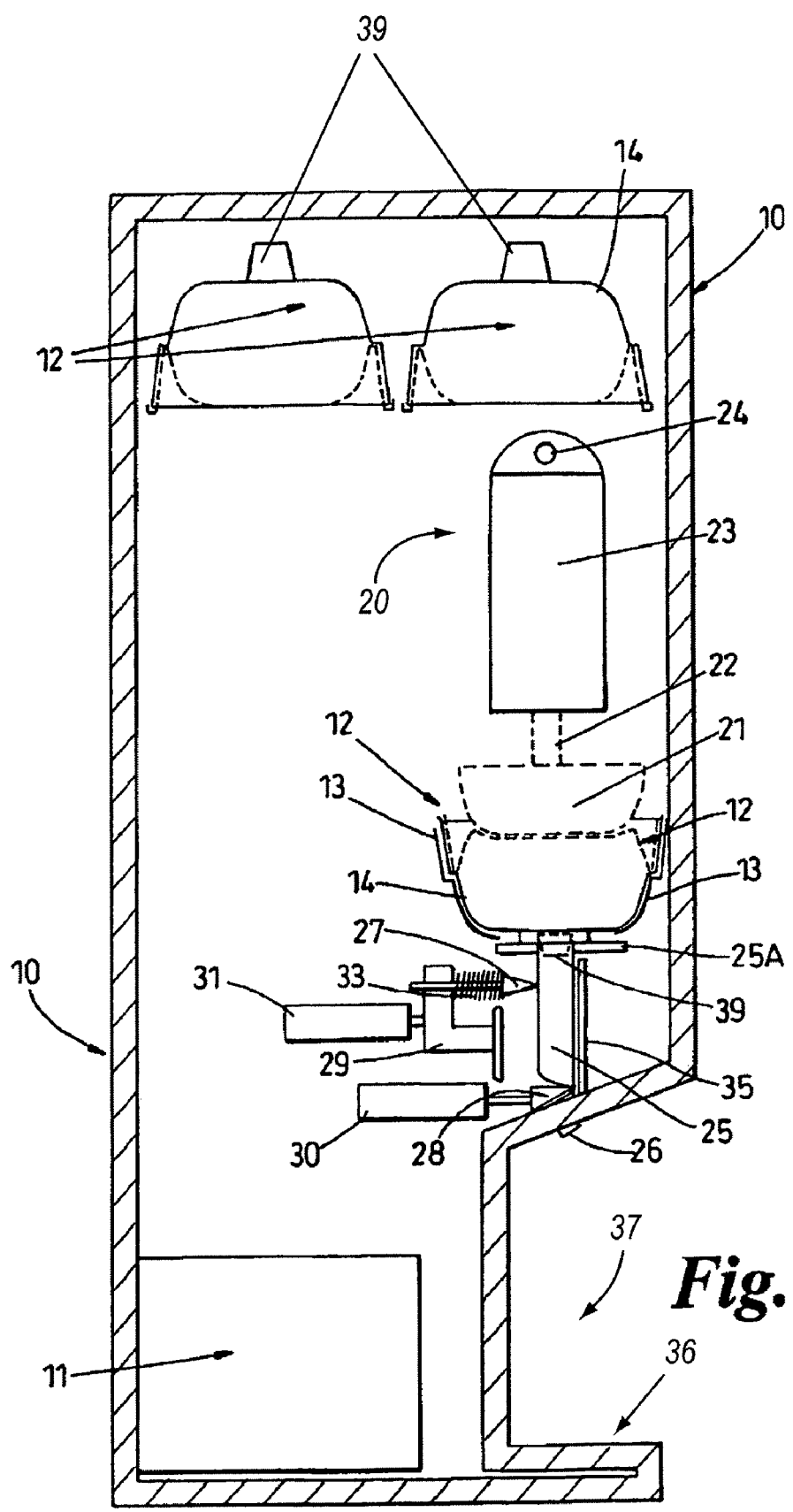

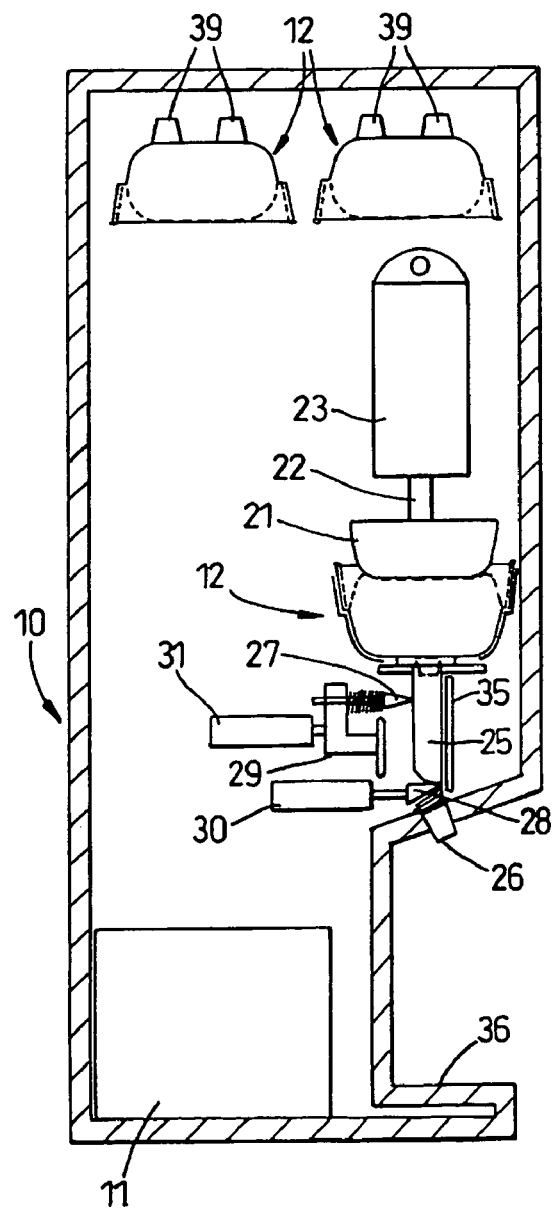
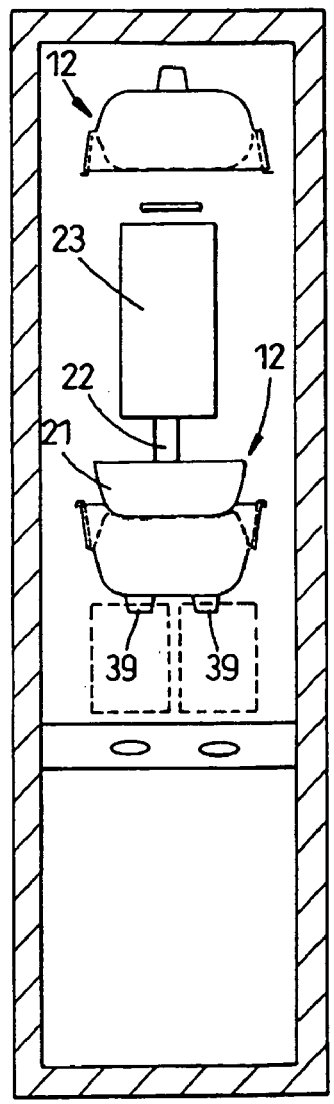
*Fig. 14A*  *Fig. 14B*

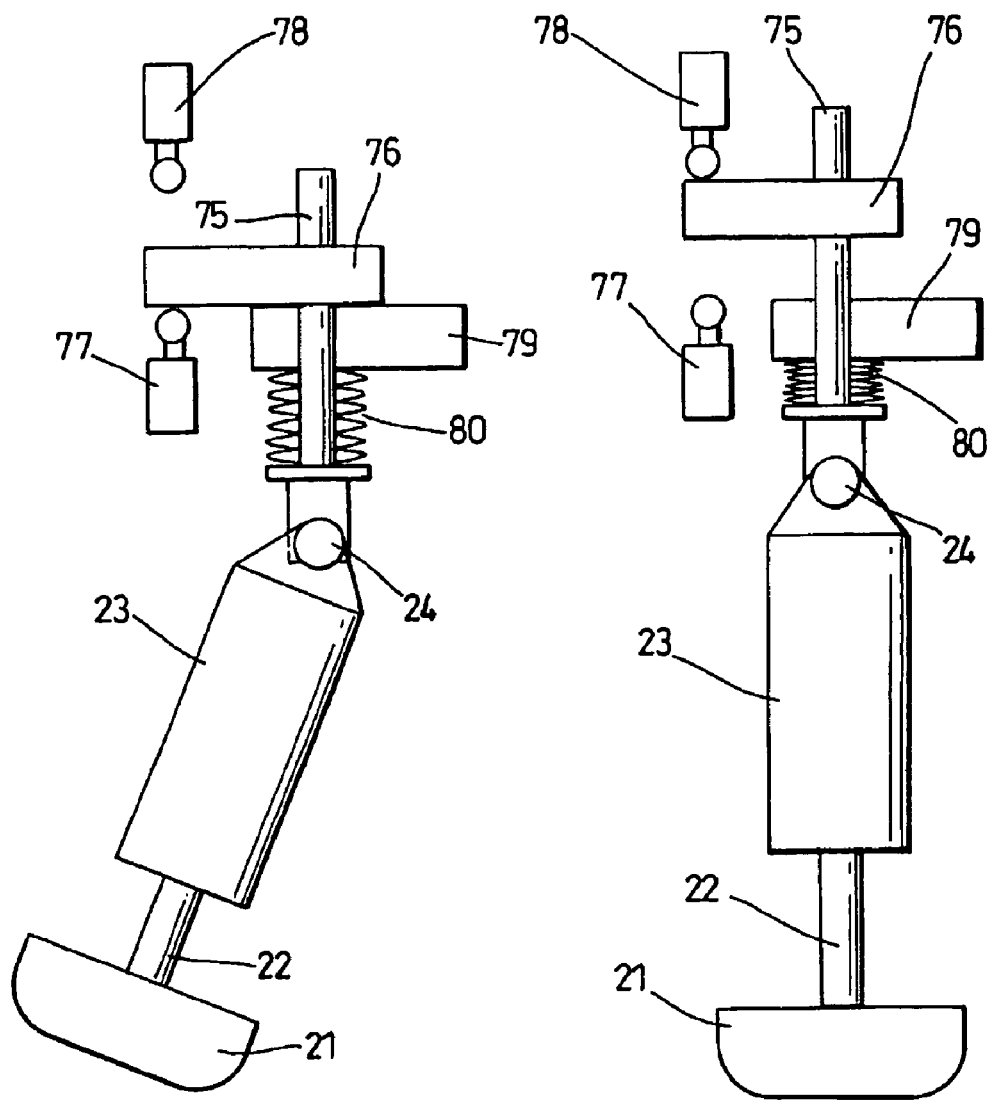
*Fig. 19A*  *Fig. 19B*

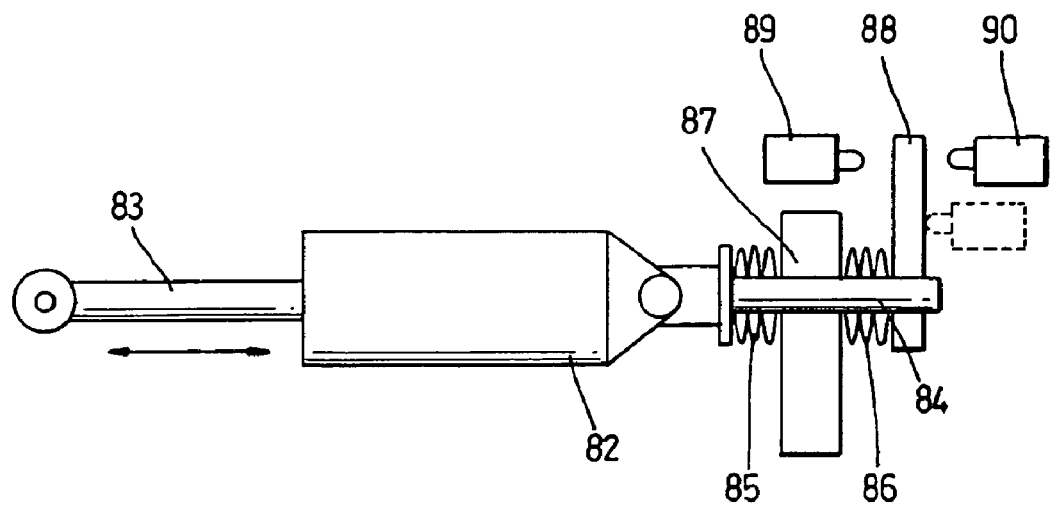
Fig. 20A
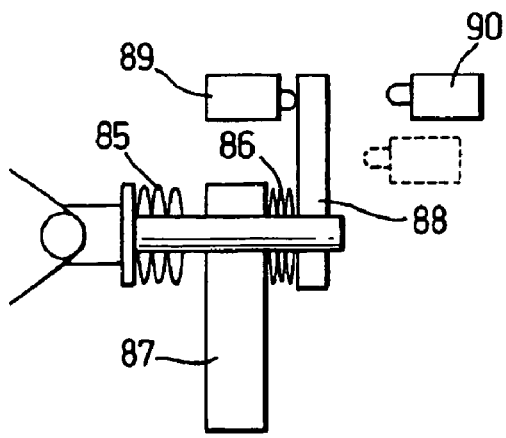 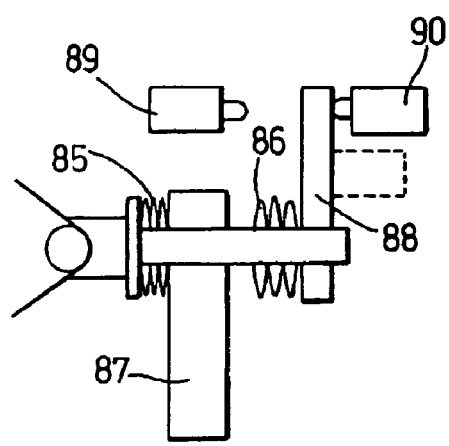
Fig. 20B  Fig. 20C

DISPENSING APPARATUS AND METHOD FOR SEMI-SOLID PRODUCT

This application is the U.S. national phase of International Application No. PCT/GB02/02772 filed 17 Jun. 2002 which designated the U.S. and claims priority to Great Britain Patent Application No. 0114685.1 filed 15 Jun. 2001, the entire contents of each of which are hereby incorporated by reference.

This invention relates to a method and apparatus for dispensing products from containers, in particular the dispensing of products by extrusion, the product having a consistency suited to extrusion.

It has been proposed to dispense food products, such as ice cream, from containers by extrusion and several kinds of containers have been proposed for this purpose including a large multi-portion container and containers which are suited to dispensing a single portion of product.

In dispensing product from multi-portion containers, problems have arisen in arranging for portions to be dispensed without manual intervention, that is the delivery of portions has usually had to be achieved by manual operation of a valve.

An object of the invention is to provide a dispensing system and method in which the dispensing of portions may be more easily controlled and, if necessary, without manual operation of the outlet valve.

According to one aspect, the invention provides a method of dispensing semi-solid product by extrusion wherein a container of product is pressurised to cause the product to be discharged by extrusion through an outlet from the container into a flexible tube, controlling the flow of product from the outlet through the tube to an outlet nozzle and drive means for causing the flexible tube to be compressed to express product from the tube towards the nozzle.

Preferably the flow of product is controlled by a first inlet valve between the container outlet and the flexible tube and a second outlet valve between the flexible tube and the nozzle.

The first valve may be opened to admit product into the tube with the second valve closed, the first valve may then be closed and the second valve opened, and then the drive means may then be operated to compress the tube and express product in the tube through said nozzle which is located downstream of the second valve.

Conveniently, operation of the drive means is controlled to express a predetermined portion of the product in the tube through the nozzle, the size of the portion ranging between all said product in the tube and a proportion of said product.

The drive means may include tube engagement means which is moveable reciprocally towards and away from tube to compress the tube.

Preferably the first and second valves are spaced apart along the tube to open and close the tube by reciprocal movement to engage, deform and close the tube at said spaced positions.

The container outlet may be releasably connected to the tube, which tube extends downwards towards the outlet nozzle which is shaped to shape product discharged therethrough and which may be releasably attached to the tube.

In one arrangement the drive means include tube engagement means moveable along the tube towards the outlet nozzle to discharge the tube contents.

The tube engagement means may include a roller which engages the tube at one end thereof and moves towards the outlet nozzle after said engagement.

The flow of product from the container may be controlled by an outlet valve between the tube and the nozzle, and by the drive means. Preferably the container and flexible tube are contained within a refrigerated environment, the nozzle projecting outwards from said environment.

According to another feature of the invention there is provided apparatus for dispensing semi-solid product, comprising a container of product, the container having an outlet, pressurising means for putting product in the container under pressure to thereby extrude product from the outlet, flexible tube means communicating with the outlet at one end and with an outlet nozzle at the other end, drive means for engaging the flexible tube to deform the tube and cause product in the tube to be discharged through said nozzle, and valve means for controlling the flow of product from the nozzle.

Preferably, the valve means includes a valve adjacent the nozzle, which valve controls the flow of product from the tube to the nozzle.

The valve means may include a further valve between the container outlet and the tube to control flow of product to the tube.

The drive means conveniently includes a reciprocal drive member arranged to engage the flexible tube to deform and flatten the tube whereby to cause product in the tube to be discharged from said nozzle.

In one arrangement the reciprocal member is moveable along the tube towards said nozzle after engaging the tube.

The container outlet and the flexible tube may be releasably connected to one another, and the tube is removable from the apparatus for replacement and/or sanitising.

Preferably the container and the flexible tube are located in a refrigerated housing whereby to keep product frozen, the nozzle projecting outwardly from the housing.

Further features of the invention will appear from the following description of an embodiment of the invention given by way of example only and with reference to the drawings, in which:—

Figure 2:
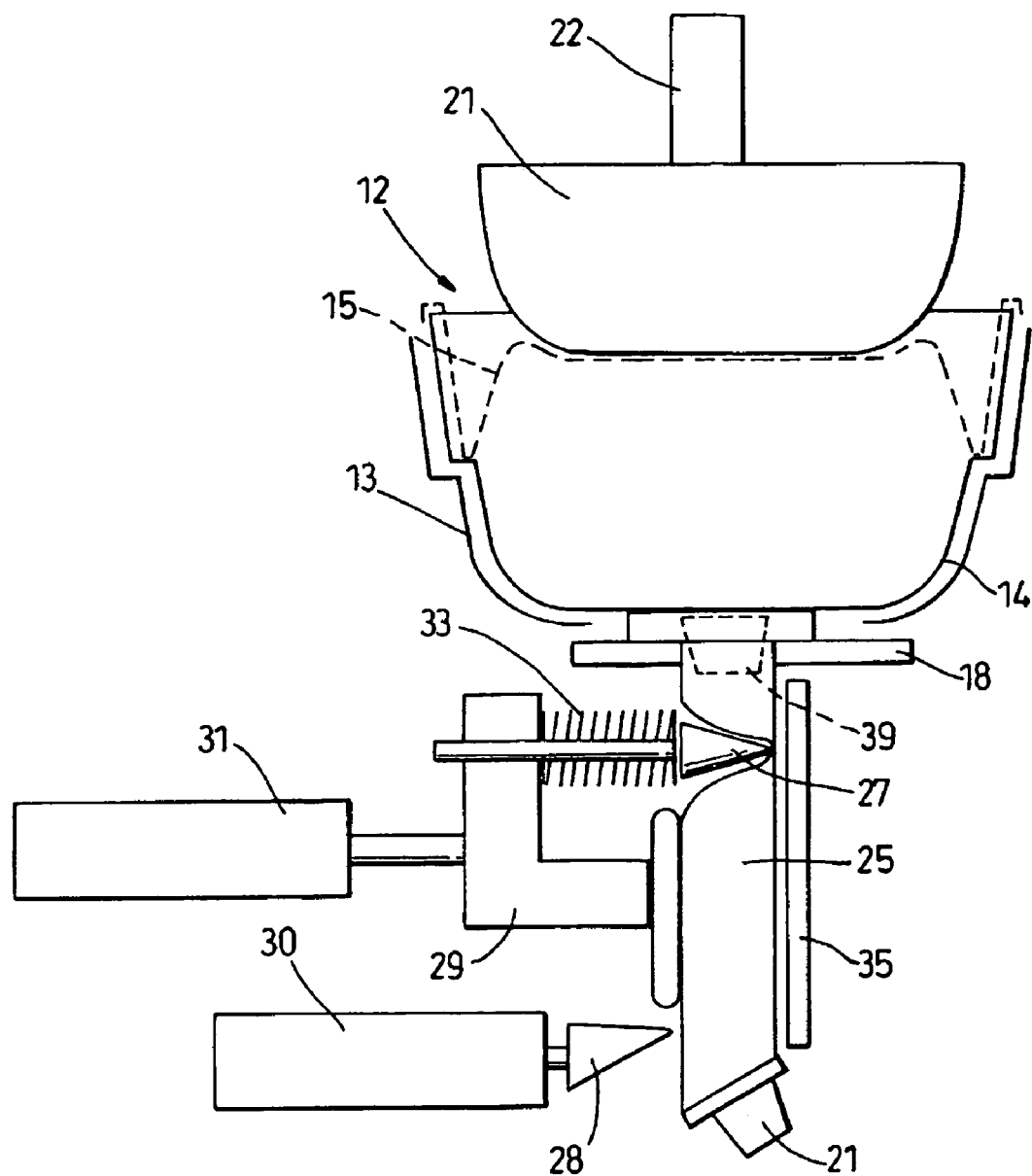
Figure 3:
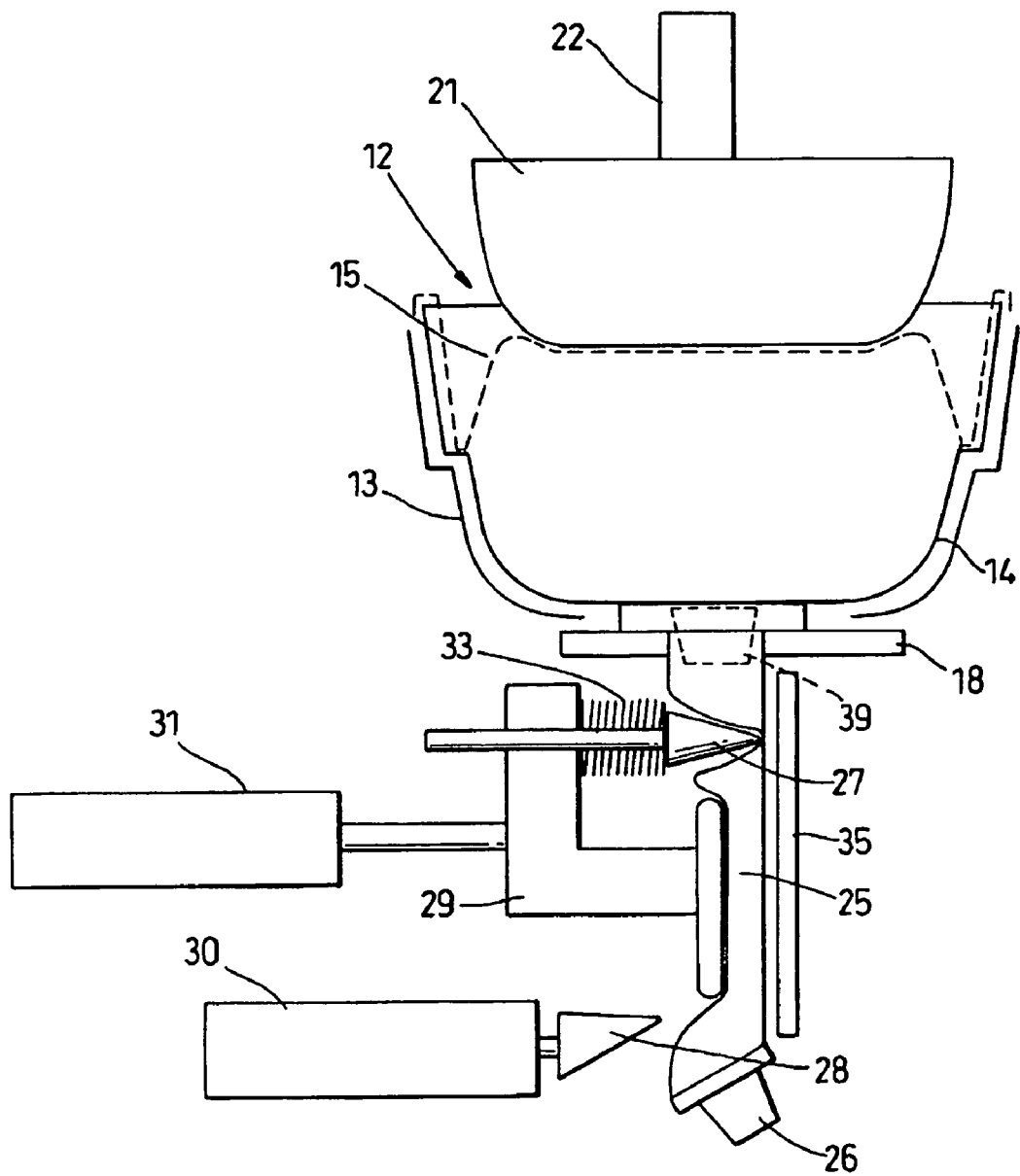
Figure 4:
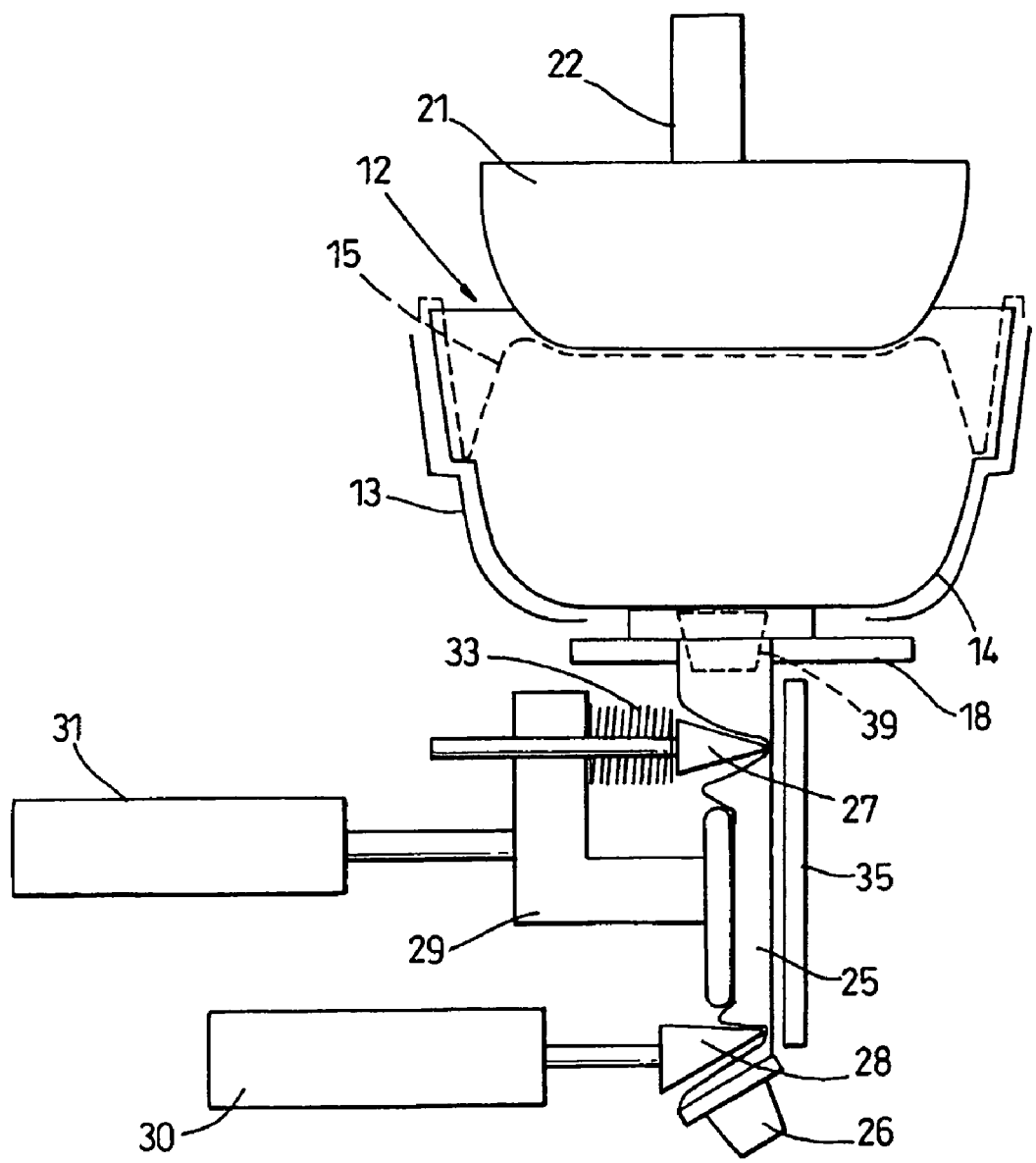
Figure 4A:
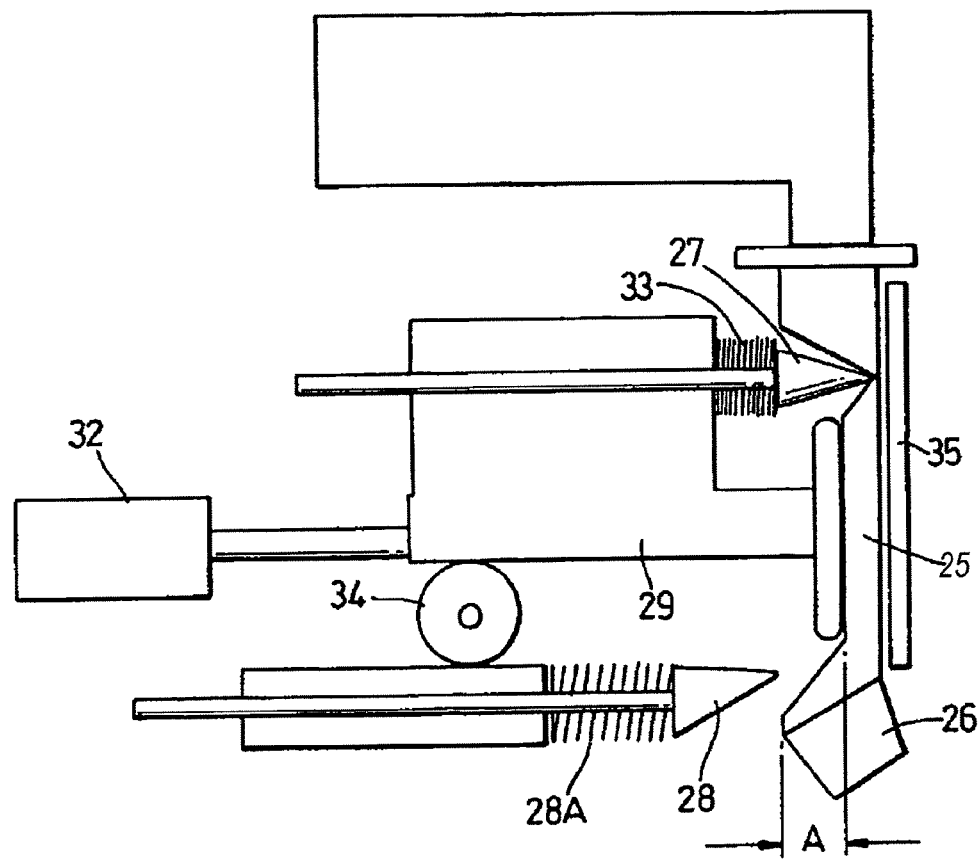
Figure 5:
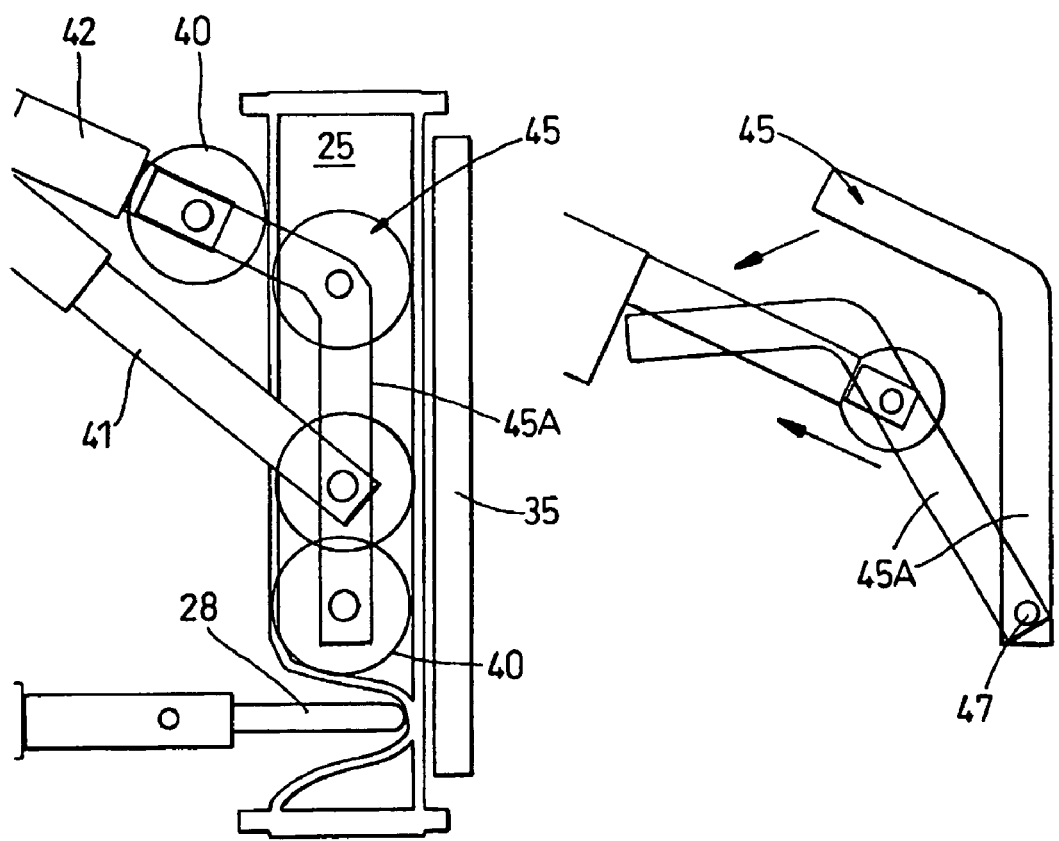
Figure 6:
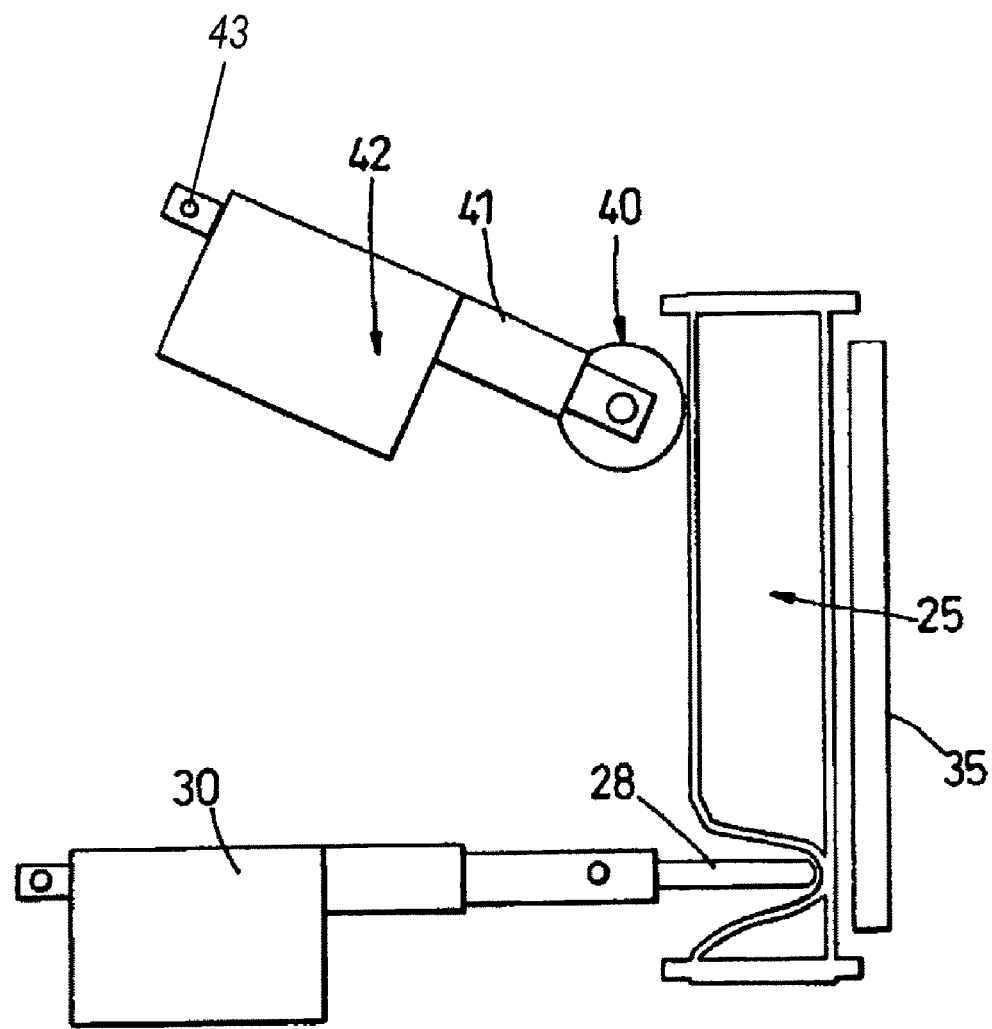
Figure 7:
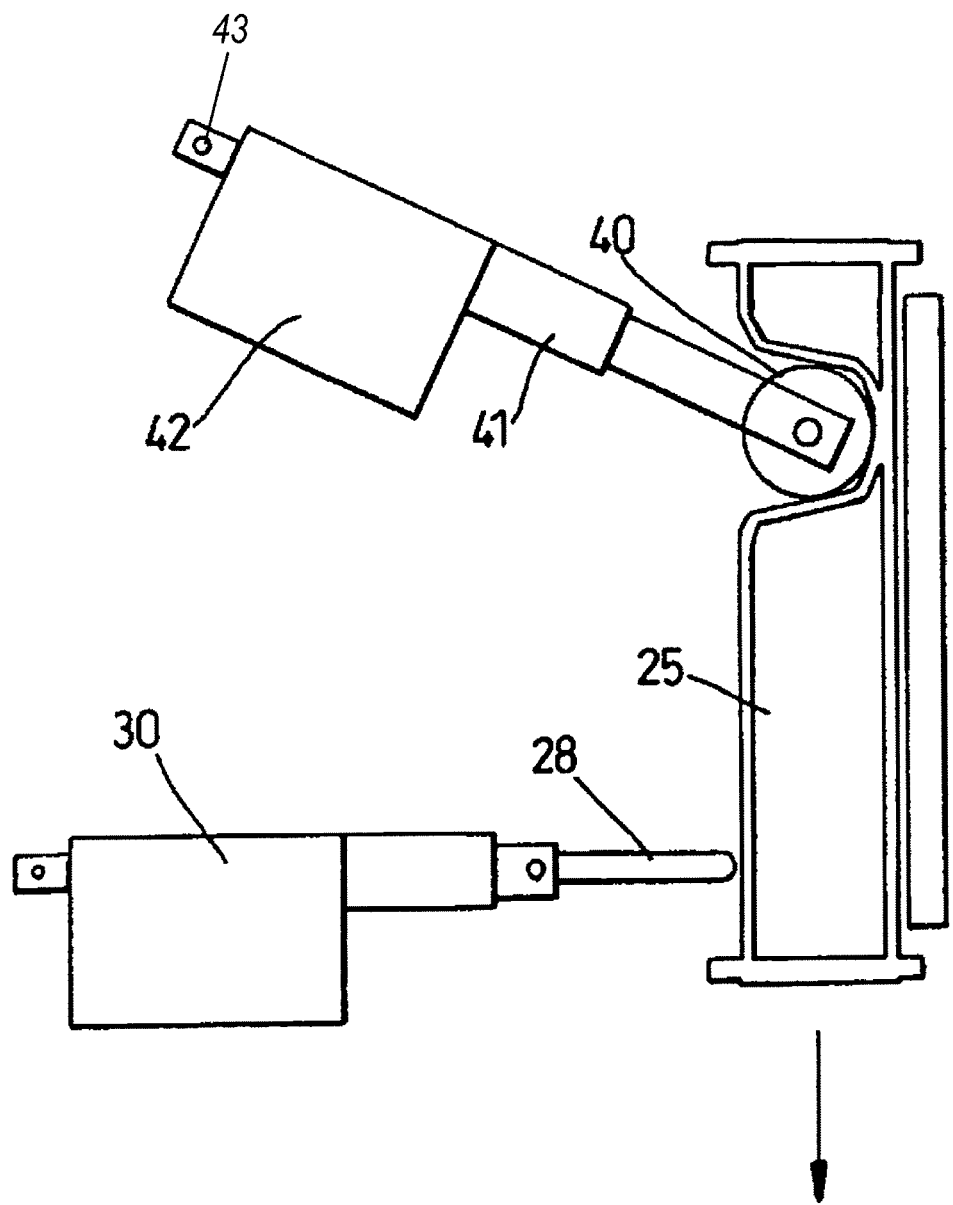
Figure 8:
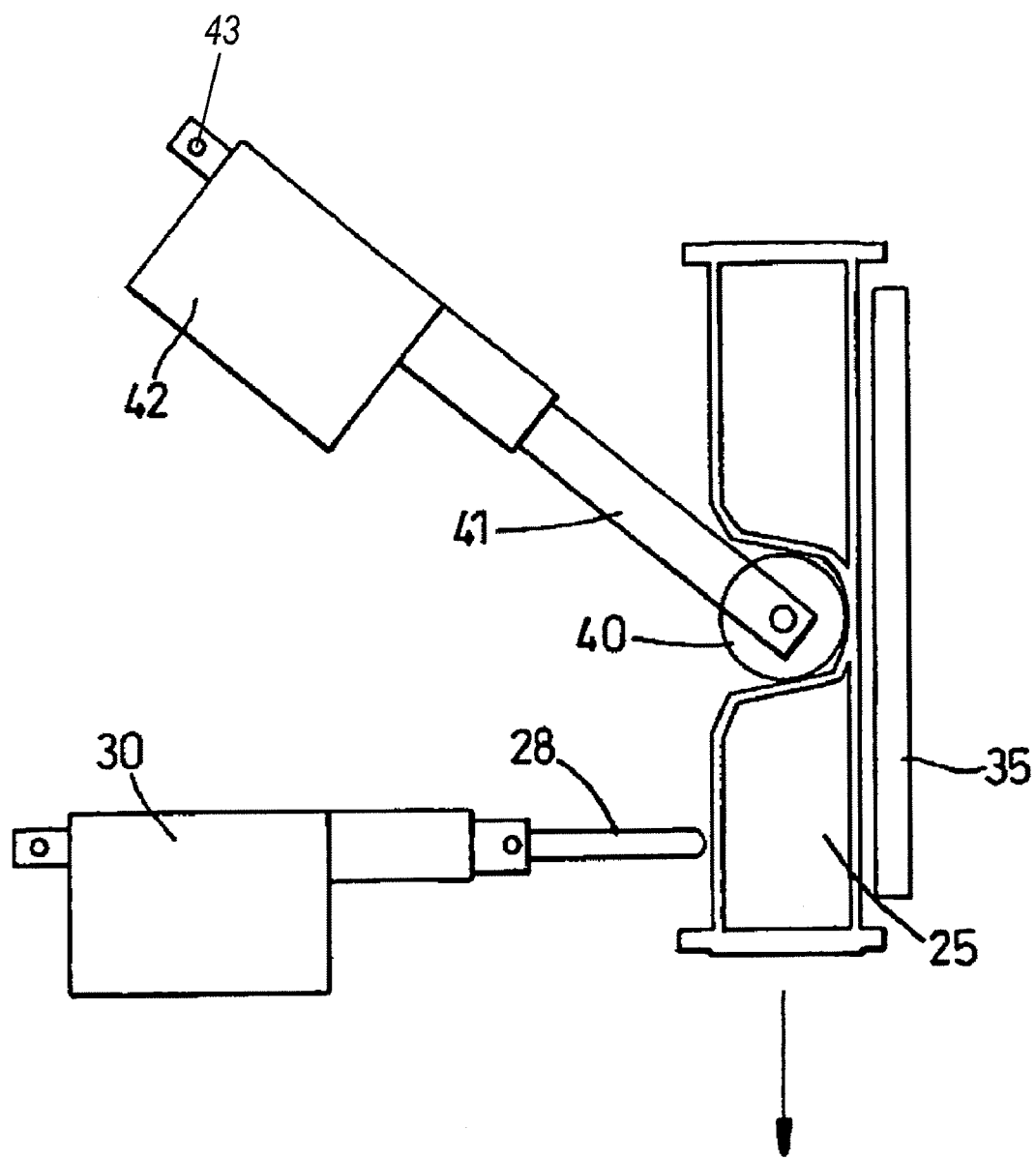
Figure 9:
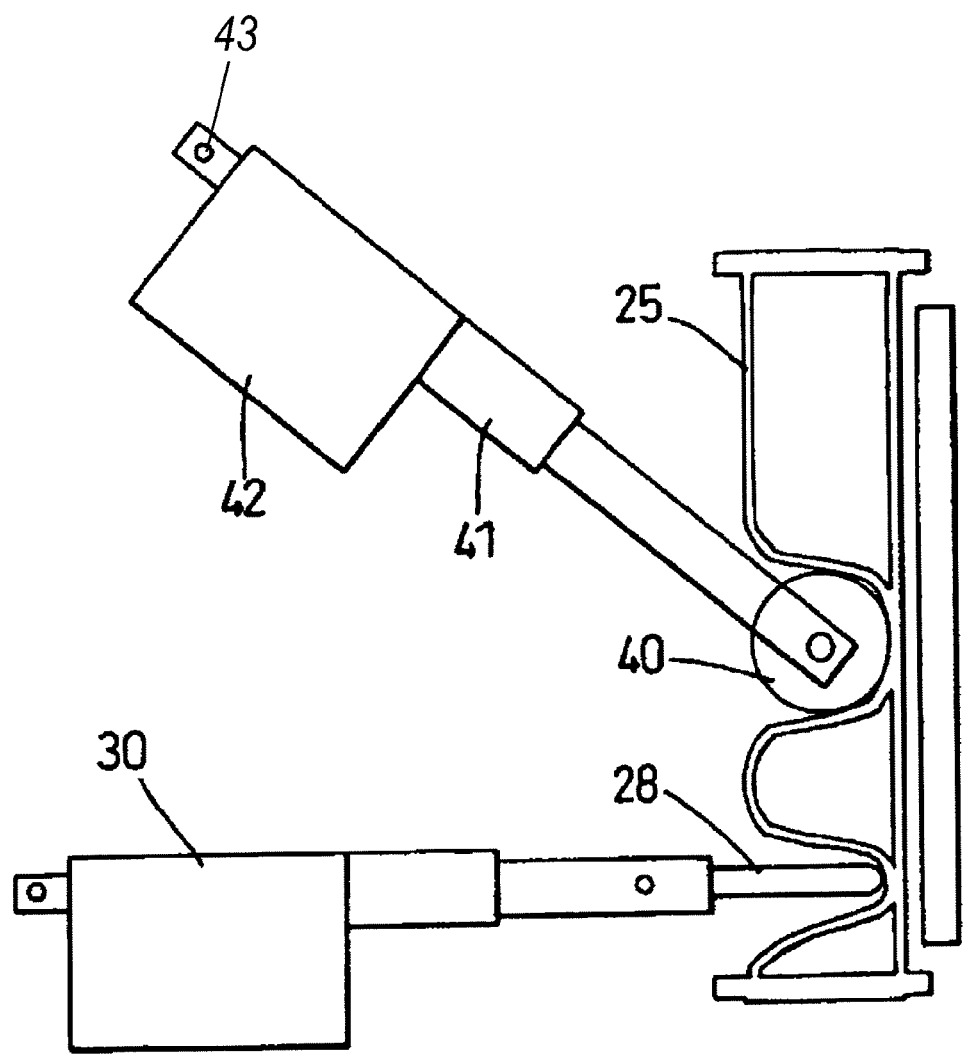
Figure 10:
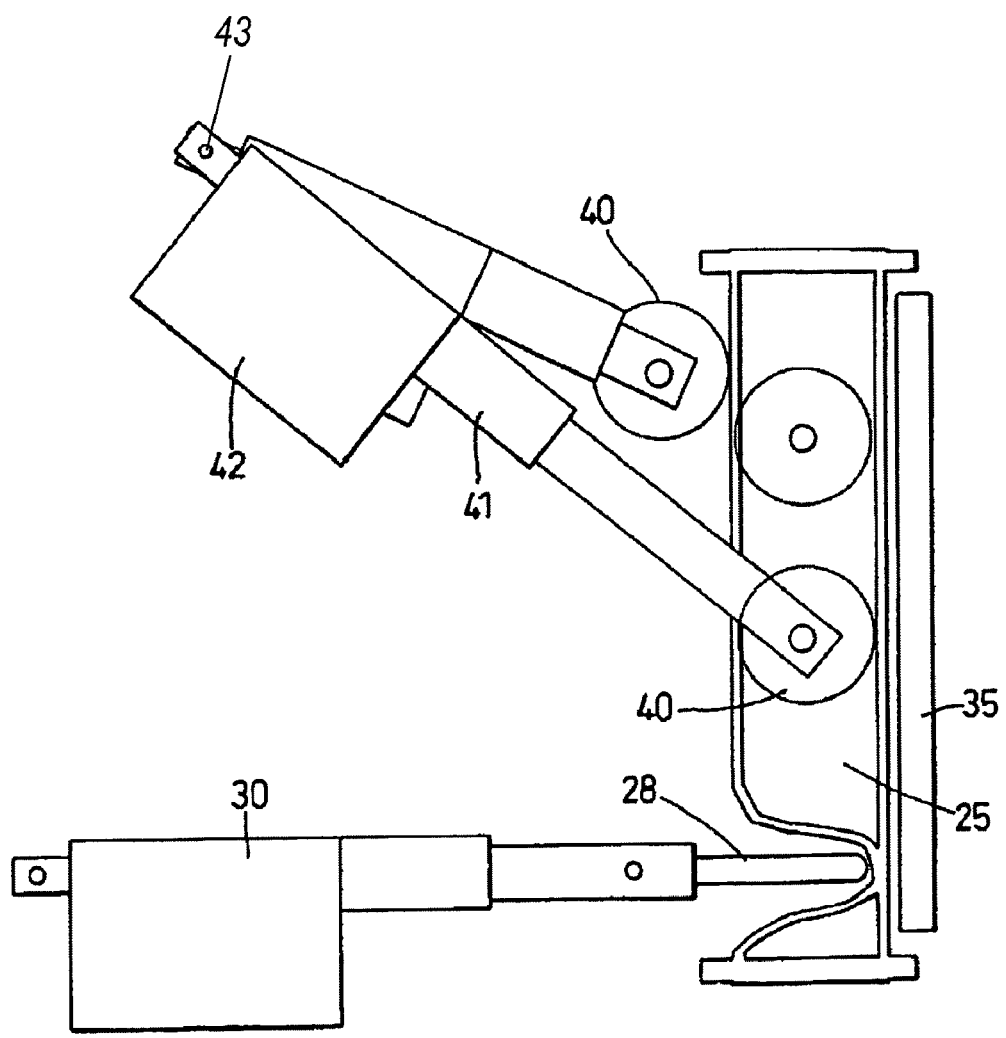
Figure 11:
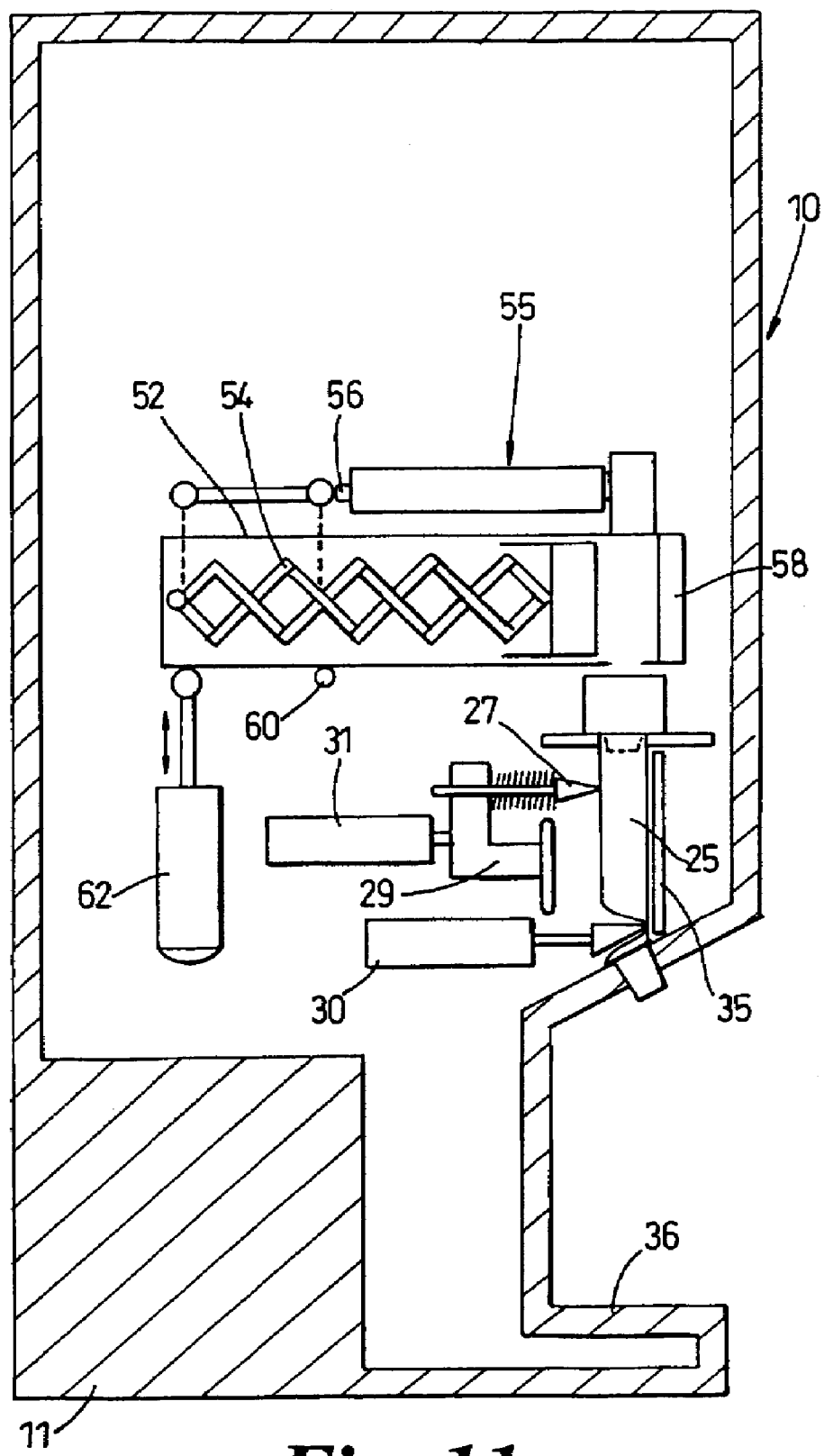
Figure 12:
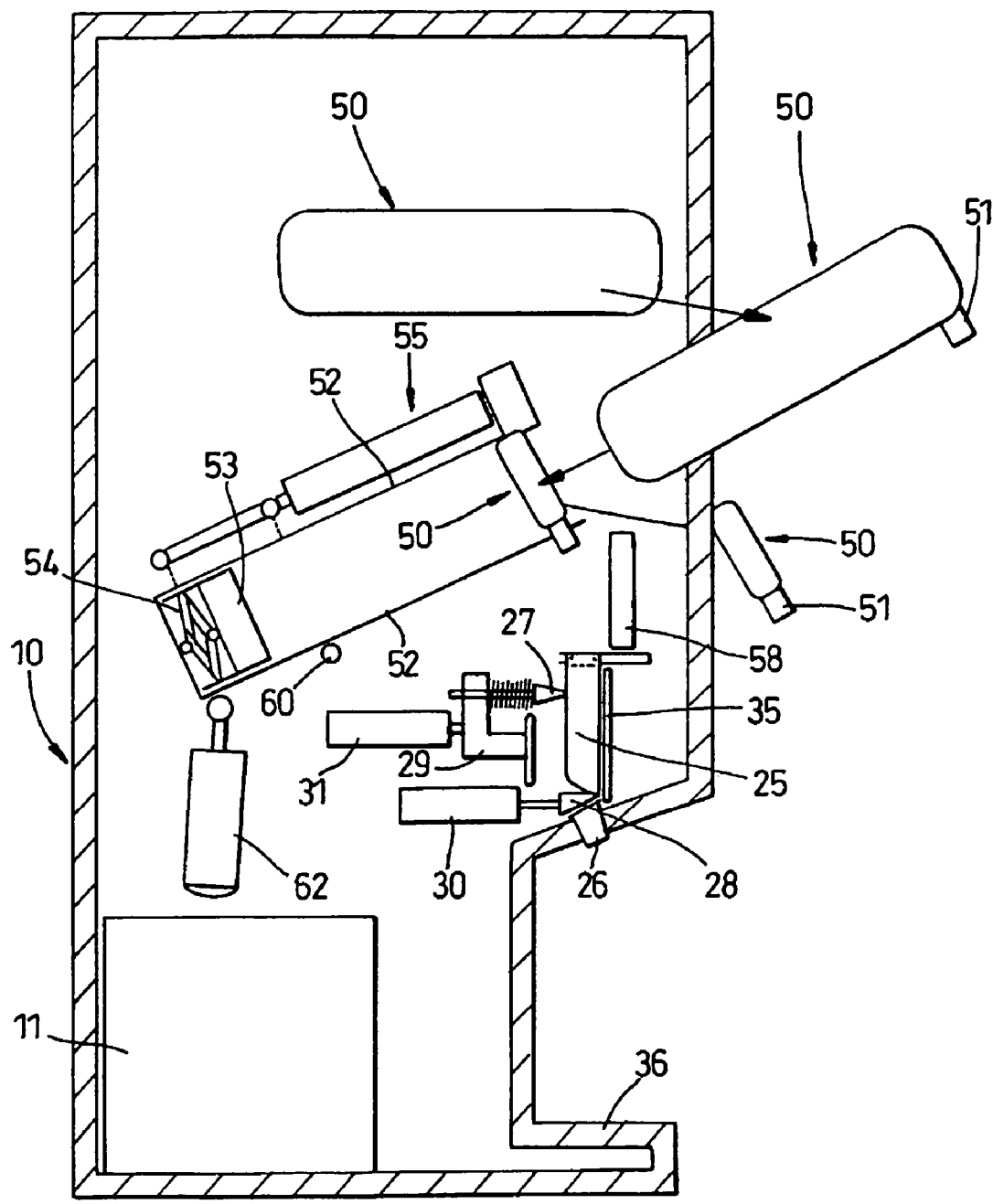
Figure 13A:
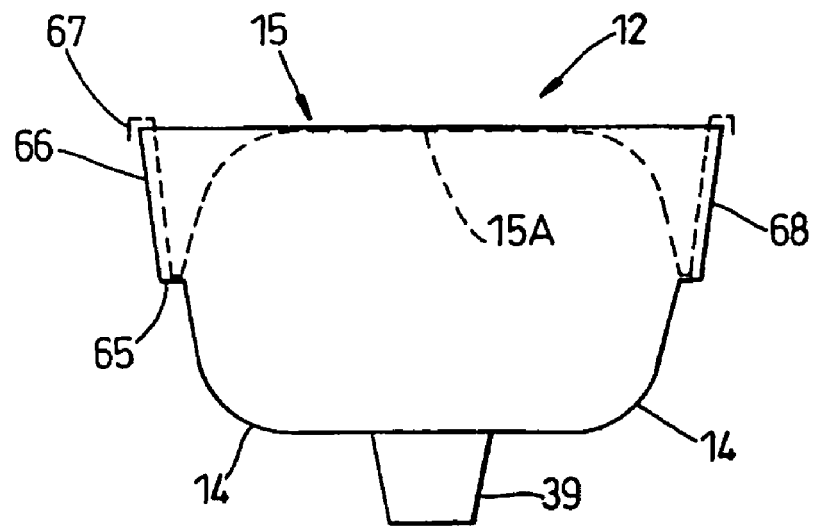
Figure 13B:
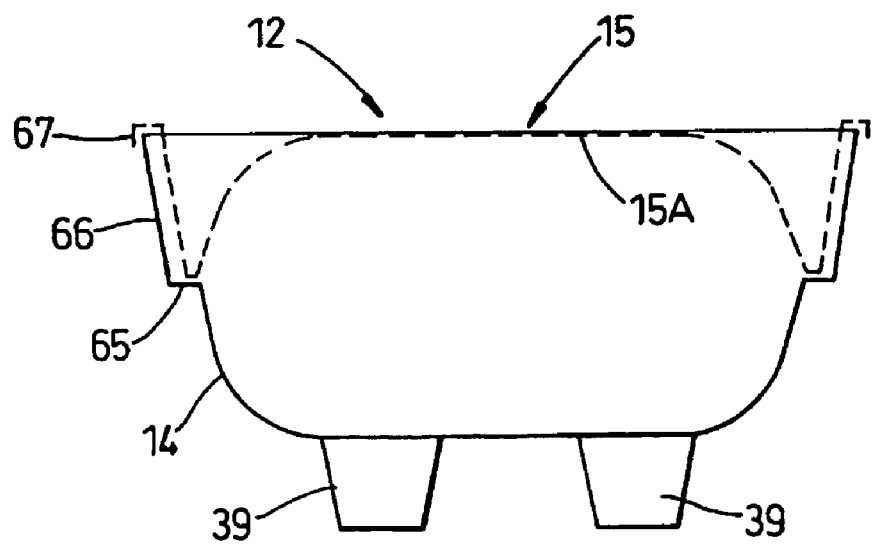

FIG. 1 is a vertical, schematic section through one embodiment of dispensing apparatus, FIG. 2 is a vertical section of part of the apparatus of FIG. 1 at one stage of operation, FIG. 3 is a view corresponding to FIG. 2 in another stage of operation, FIG. 4 is a view corresponding to FIG. 2 in another stage of operation, FIG. 4A is a vertical section of that part of the apparatus of FIGS. 2-4 with a modified drive, FIG. 5 is a partial vertical section of an alternative arrangement of that shown in FIGS. 1-4, FIG. 6 is an alternative drive arrangement to that shown in FIG. 5, FIG. 7 is a view corresponding to FIG. 6 showing one stage of operation, FIG. 8 is a view corresponding to FIG. 7 in another stage of operation, FIG. 9 is a view corresponding to FIGS. 7 and 8 in another stage of operation, FIG. 10 is a view corresponding to FIGS. 6-9 in another stage of operation, FIG. 11 is a schematic vertical section through alternative apparatus to that of FIG. 1 employing a different container, FIG. 12 is a view of the apparatus of FIG. 11 showing recharging of a container, FIG. 13A and FIG. 13B are embodiments of container suitable for use in the FIG. 1 apparatus.

Figure 15:
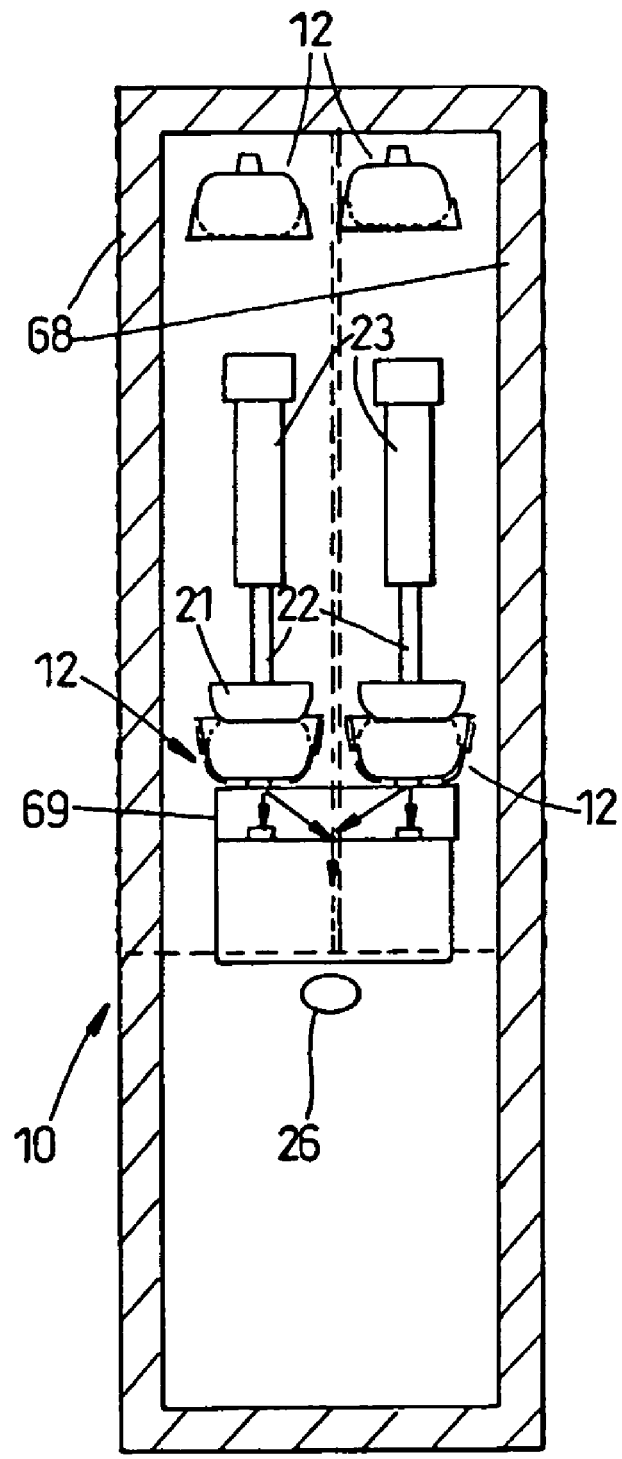
Figure 16:
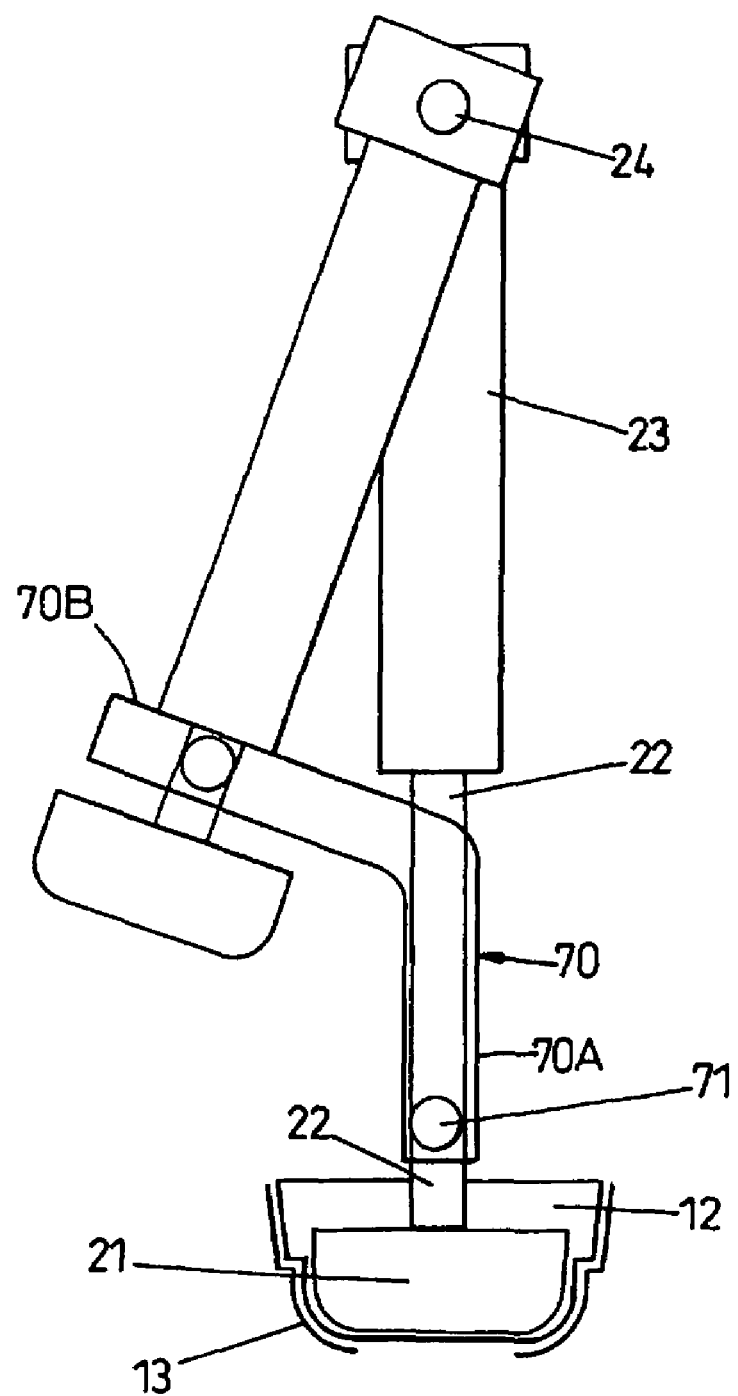
Figure 17:
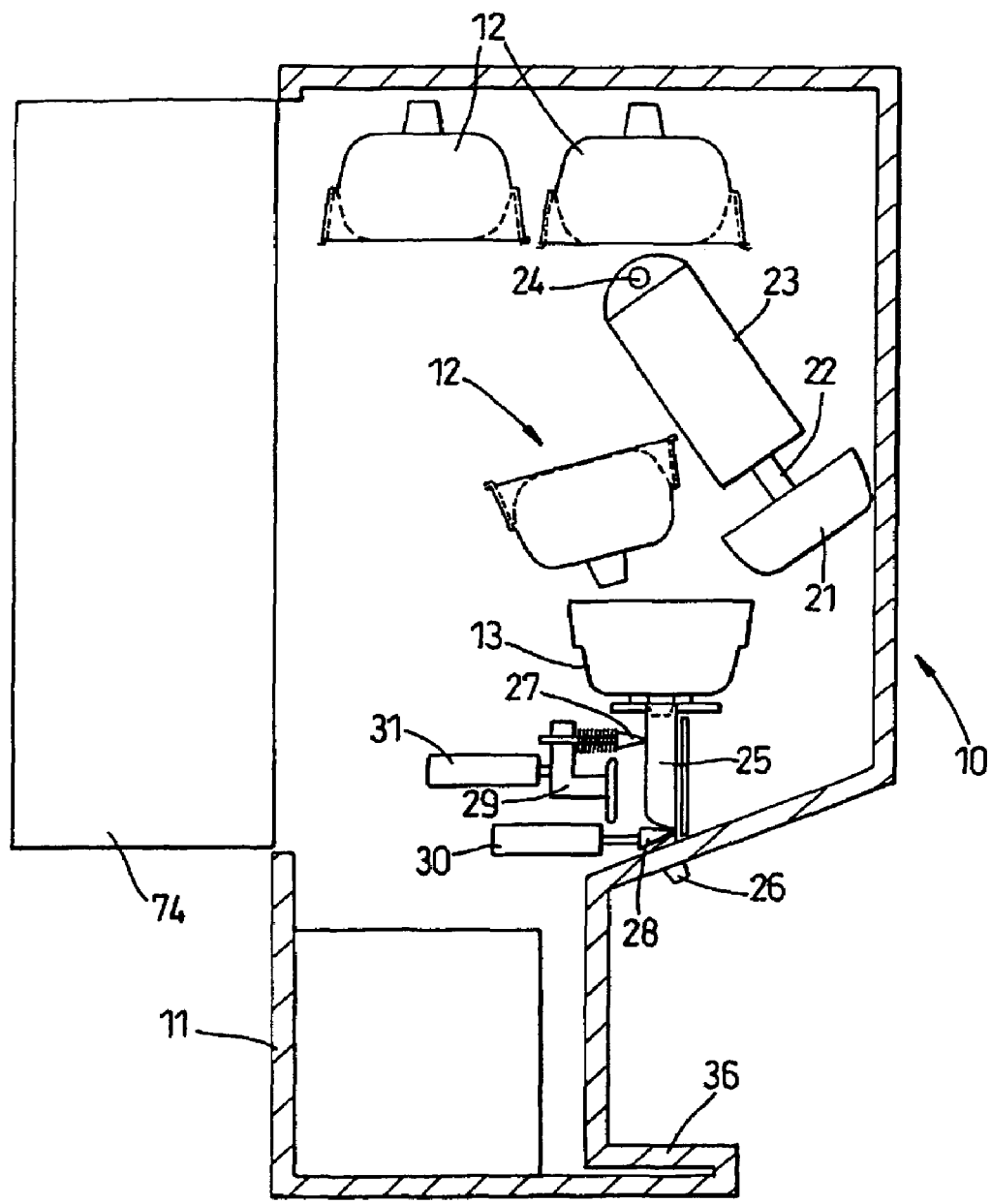
Figure 18:
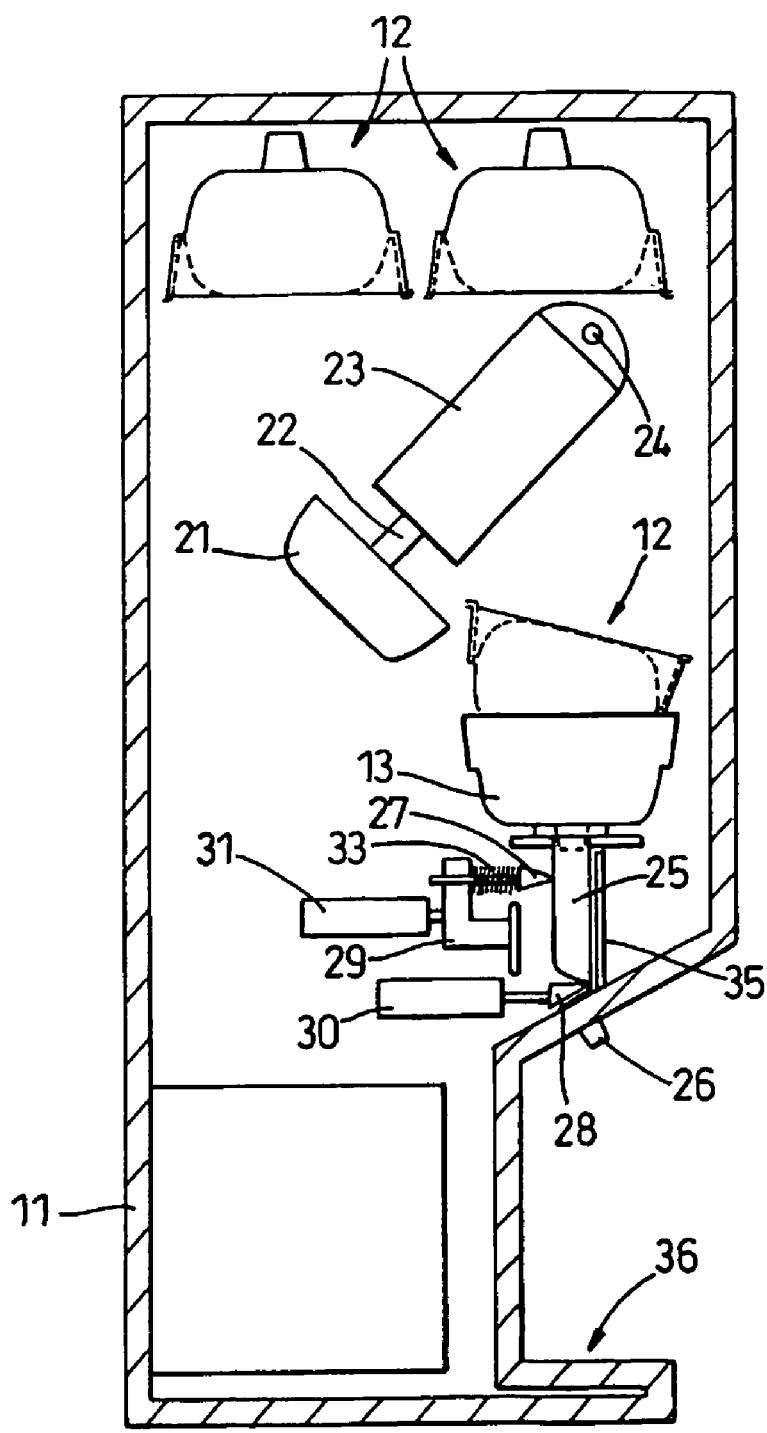
Figure 21A:
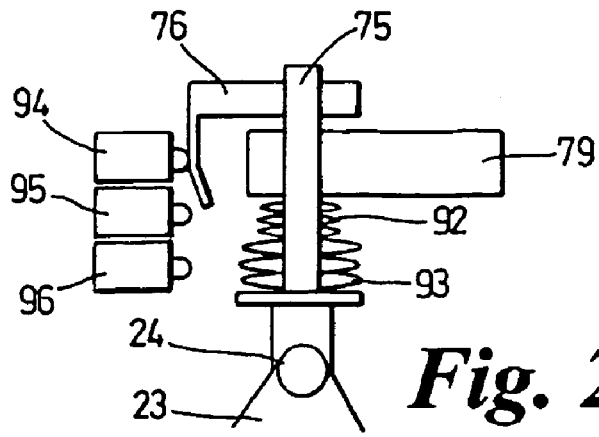
Figure 21B:
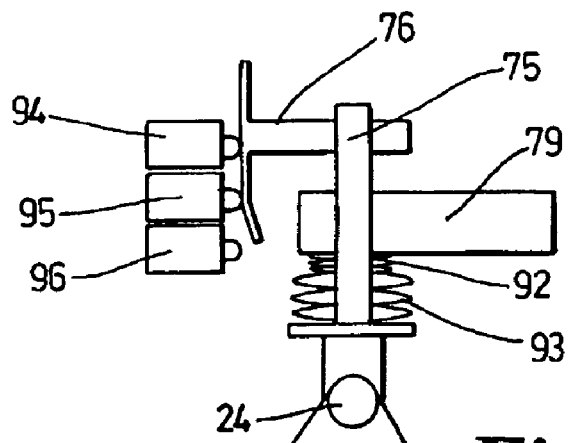
Figure 21C:
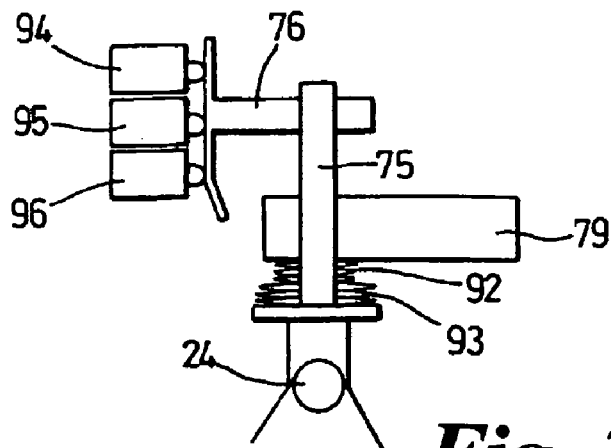
Figure 22:
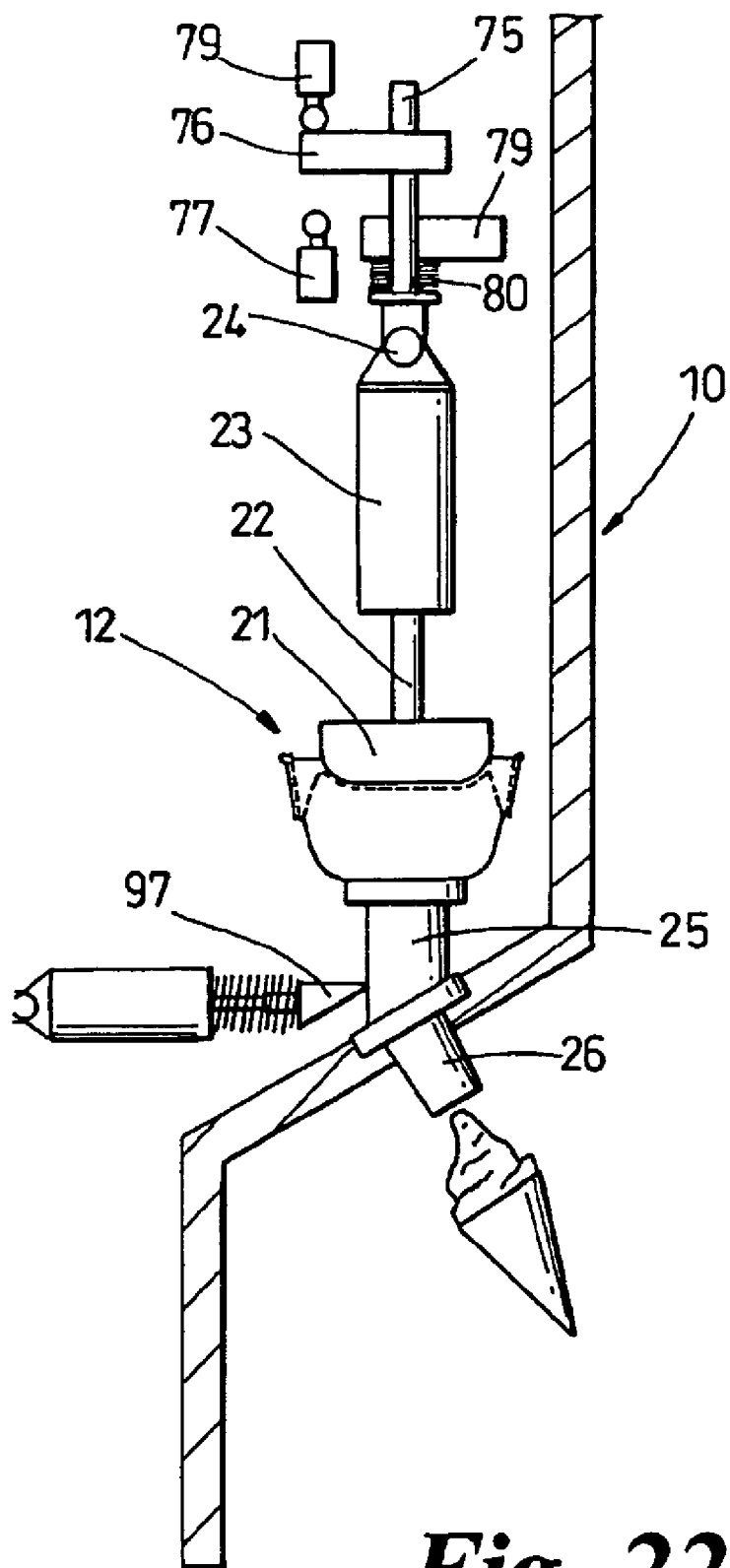

FIG. 14A is a vertical section through apparatus similar to that of FIG. 1 employing the container of FIG. 13B, FIG. 14B is a side elevation of the apparatus in FIG. 14A, FIG. 15 is a side elevation of apparatus similar to that of FIG. 1 employing two containers, FIG. 16 is an elevation showing an alternative drive system for dispensing from containers, FIG. 17 is a vertical section of apparatus similar to that of FIG. 1 showing container removal arrangement, FIG. 18 is a view corresponding to FIG. 17 showing another container removal arrangement, FIG. 19A and FIG. 19B show container discharge means for the apparatus of FIG. 1 in alternative positions, FIGS. 20A, 20B and 20C show a container drive arrangement with overload protection in three different positions, FIGS. 21A, 21B and 21C show part of another container drive system with overload protection, and FIG. 22 shows in vertical section apparatus similar to that of FIG. 1 with drive overload protection.

Referring to the drawings and firstly to FIGS. 1-4, there is shown apparatus for dispensing semi-solid or viscous ice cream product. The apparatus includes a housing 10 which has refrigeration means 11 whereby the interior of the housing 10 is kept at a suitable temperature, usually below freezing point, but sometimes above, suited to the food products (usually ice cream product) to be dispensed. The housing 10 is arranged to have storage capacity for filled ice-cream containers 12 to be dispensed. A container 12 ready to be dispensed is located on a seating 13 mounted within the housing 10.

The container 12 is formed with a base portion 14 and a closure 15 which has an upwardly directed deformable portion which, during dispensing of product from within the container, is deformed by being inverted until it adopts the contours of the inner surface of the base 14 by which time the container contents are fully discharged. In this case, the outlet on the container is formed with a nozzle 39 which tapers inwardly away from the container 12. The closure 15 is usually located over the base 14 when the base has been filled with product to thereby seal the container, the closure 15 fitting over the upper edges of the base 14.

The base 14 and the closure 15 are preferably heat-sealed to one another when filled. In some cases the container 12 is formed as a sealed assembly before the product is introduced into the container in which case the container is filled through the nozzle 39. Heat sealing prevents re-use of the container.

The container 12 is located on the seating 14 which has an opening in its base through which the nozzle 39 is directed. There is also provided an abutment plate 18 to resist the pressure exerted on the container during dispensing. Dispensing is caused by a drive arrangement 20 which consists of a plunger 21 mounted on a rod 22 and driven by a linear drive arrangement 23, the linear drive arrangement usually taking the form of an electric motor, rotation of which is converted into a linear reciprocating movement of the plunger 21. The drive arrangement is mounted on the housing pivotable about a pivot axis 24.

The plunger 21 is arranged to engage the deformable portion of the container 12 whereby to deform that portion downwardly towards the base 14 and thereby discharging, by extrusion, ice cream from the container through the nozzle 39, which has a smaller cross-section than the container.

The nozzle 39 is releasably, sealingly connected to a flexible tube 25 which extends downward from the outlet nozzle 39 and the tube 25 is integral with or connected to a discharge nozzle 26 at its opposite end.

The tube 25 is sufficiently flexible to be deformed so that it is substantially flat with one inner side wall of the tube engaging the opposite side wall. Alternatively, the tube 25 is deformable so that the tube retains a part circular shape over the portion into which the other portion deforms, the tube being supported by a part circular support.

Associated with the flexible tube 25 are upper and lower valves 27 and 28. The valves 27 and 28 are reciprocally moveable towards and away from the tube 25 whereby to pinch the tube and act to prevent product from passing along the tube beyond the associated valve. For this purpose the head of the valve is formed with a tapered end which extends across the width of the tube 25, in each case. Alternatively the heads of the valves are shaped according to the shape of the tube support.

In addition to the valves 27 and 28 there is provided a reciprocally moveable tube discharge plate 29 comprising a flat plate which is arranged to engage the tube 25 and cause the contents to pass downwardly and out of the nozzle 26 when the valve 28 is open. Alternatively, the plate 29 is formed with a portion engaging the tube which is shaped according to the shape of the tube support, for example, part circular.

The valve 28 has drive means 30 to move the valve backwards and forwards between a closed and an open position. Similarly the valve 27 has drive means 31 which causes movement of the valve head towards and away from the tube 25. As illustrated in FIG. 1 the drive means 31 also is arranged to move the drive plate 29 but the valve 27 and the drive plate 29 may have separate drive means. The drive means are conveniently linear drives which include an electric motor whose rotary movement is converted into a linear movement, for example through a worm and worm-wheel.

There will now be described the sequence by which discharge of containers 12 is achieved with particular reference to FIGS. 1-4.

In FIG. 1 the container 12 is put under pressure by engagement by the plunger 21, the valve 27 is in the open position and the valve 28 is closed. The tube 25 fills with product extruded from a container 12 and pressure is released from the container 12 after a specific lapse of time (FIG. 1) and the plunger 21 may be backed off from the container 12.

The valve 27 is now closed to restrict further passage of product into the tube 25 and valve 28 is opened. When the valve 27 has closed the upper end of the tube 25, the discharge member 29 begins to engage the tube 25, as shown in FIG. 2, so that product is discharged from the tube 25 through the nozzle 26 into a receptacle for the product (not shown) which may be a cone or dish. Pressure of the member 29 continues to be applied to the tube 25 so that product in the tube 25 can be fully discharged from the nozzle 26 (FIG. 3). If desired, only a predetermined portion of the product in the tube 25 may be discharged, movement of the member 29 being interrupted when the required amount has been discharged and the drive means 31 may be programmed to move a measured predetermined amount or for a predetermined time depending, for example, on a prepayment made to the apparatus in coin-freed mode. Thus, for example, half the amount in the tube 25 may be discharged for half the payment required for discharge from the full tube.

More particularly the apparatus may be arranged to dispense any preselected amount of product between complete discharge of the tube and minimum discharge. The user may be able to select the amount dispensed by the use of controls or buttons on the apparatus, for example, for 120 ml, 180 ml or 250 ml, or by the amount of payment made by, for example, coin or note insertion, credit card or the like and one payment may enable several portions of different sizes to be dispensed. The control on the apparatus may include audible information to the user, for example, by electronic voice information. The preselected amounts to be dispensed are transmitted to the dispensing means which moves to dispense the selected amounts.

After the required amount has been discharged from the tube 25, the valve 28 is moved to a closed position, as shown in FIG. 4. Thereafter the member 29 and the valve 27 are withdrawn from engagement with the tube 25 so that the tube 25 may be refilled upon application of further pressure to the container 12.

In determining the quantity discharged, account is taken of a small quantity discharged by operation of the valves.

It is usually not desirable for product in the container 12 to be pressurised for extended periods when not in use as this can affect the quality of the product in the container. Accordingly, control means may be provided to automatically back off the plunger 21 from the container after a predetermined lapse of time since the apparatus was last operated. Backing off may move the plunger back a small distance from the container.

It will be appreciated that the drive 23 for the plunger 21 operates at a fixed speed which permits ready control of dispensing quantities from the container 12 by time and/or distance.

As shown in FIGS. 1-4, the member 29 and valve 27 are driven by a common drive 31 but it will be appreciated that a further drive similar to the drive 31 can be employed for operating the valve 27 so that this is operated independently of the member 29. In the illustrated arrangement, using a common drive 31, the valve 27 incorporates spring means 33 compressing to enable the valve 27 to take up said further movement. An abutment plate 35 is provided behind the tube 25 to act as an abutment to the compressive action on the tube 25 by the valves 27, 28, and member 29.

Product discharging from the nozzle 26 is directed downwardly so that the product descends under gravity into the receptacle and there is provided a drip tray 36 to receive any product falling from the nozzle 26, there being defined a recess 37 in which the receptacle is held by the operator.

The container 12 is formed with a tapering nozzle 39 which defines the outlet from the container 12 and the nozzle is arranged to sealingly engage into the upper end of the tube 25, the tube 25 being readily releasable from the nozzle 39 for replacement and/or cleaning. The member 29 is conveniently attachable to the side of the tube 25 which it engages. After a dispensing action the member 29 may be moved rearwards drawing the tube with it which acts to draw back into the tube product which is below the member 29 and in the nozzle 26.

In order to readily release the tube 25 and associated nozzle for cleaning or replacement, the abutment plate 35 may be hinged to move it out of the way and access through a door into the housing permits removal of the tube, preferably without the use of tools. The tube 25 may be washable or may be replaced.

Referring now to FIG. 4A there is shown the arrangement of FIGS. 1-4 in which the drives 30 and 31 are replaced by a single drive 32 directly connected to member 29 and valve 27 and connected by a gear wheel 34 to the valve 28. The gear wheel 34 meshes with teeth on the member 29 and teeth on the support for the valve 28 so that as the member 29 moves in one direction the valve 28 moves in the opposite direction. The valve 28 is provided with a spring 28A similar to the spring 33 for valve 27.

Thus a member 29 moves to pressurize the tube 25 the valve 28 moves rearwards to permit passage of product to the nozzle 26. A reverse movement has the opposite action and the valve 28 closes the bottom end of the tube 25.

Referring to FIGS. 5-10 there is shown an alternative to the reciprocal pushing member 29 in which product is discharged from the tube 25 by a roller 40 carried on the end of a rod 41 driven by reciprocal drive means 42. The drive means is carried on a pivot 43 for pivotal movement of the roller 40 up and down about the pivot 43. The roller 40 is arranged to engage the tube 25 towards the upper end of the tube to compress the tube at its upper end and then to move down the tube, compressing the tube as it passes towards the lower end of the tube. Such downward movement of the roller 40 may be achieved by the axis of the guide means and rod 41 being inclined to the horizontal and when the roller has fully compressed the tube 25 it moves downwards towards the lower end of the tube, as seen in FIG. 6. Alternatively, the roller may be located in a cam track 45 so that as the roller is extended it moves along the cam track 25, initially inclined to the axis of the tube and then over portion 45A extending in the longitudinal direction of the tube 25 (FIG. 5). In each case, the roller effects movement of the product from the tube 25 and through the nozzle 26 when the valve 28 is opened.

In the arrangement of FIGS. 5 and 6 it may be possible to omit the valve 27 since the roller 40 will close the upper end of the tube 25 in its initial movement and, as the roller 40 moves down the tube further product can be admitted to the upper end of the tube behind the roller. An alternative arrangement for the cam track is shown in FIG. 5 in which the cam track itself is pivoted about its lower end at 47.

It will be appreciated that the nozzle 26 is shaped to shape product being discharged, usually in a star shape to give an attractive appearance to the product.

It will also be appreciated that with the use of the roller arrangement 40, the roller can pass along the tube a predetermined amount to discharge a predetermined quantity of the product which may be less than the total product contained within the tube 25. After the roller 40 has moved a predetermined amount, the valve 28 is closed to prevent further discharge. The full sequence of emptying the tube 25 is shown in FIGS. 6-10.

The tube 25 may have at each end flanges 25A by which the ends of the tube are located and locked in the apparatus. The nozzle 26 is arranged to be slideable into the housing and the abutment plate 35 is hinged so that upon opening the front door of the housing 10 and moving the plate away, the nozzle is removeable.

Instead of the tube 25 being engageable with the plate 35 it may be locatable inside a rigid housing and may be made fixed to the housing so that the tube is removeable for cleaning. It may also be arranged that the tube 25, nozzle 26 and plate 35 are integral and removeable as a unit and made of material suitable for sanitising, such as steel or plastics.

The container 12 may be located on a support which, when the plunger is moved upwards clear of the container, is slideable forwards on guides (not shown) to access the container support and replace the container in its support. Alternatively the support 13 for the container 12 may be hinged to allow the support to be pivoted forwards to remove and replace the container with support 13.

Turning now to FIGS. 11 and 12 there is shown an alternative form of apparatus in which the same reference numbers are used for similar parts. Thus, there is a housing 10, the interior of which is refrigerated by refrigeration means 11 contained in the base of the housing. A similar form of portion control mechanism is employed as for the previous embodiment including valves 27 and 28, a pushing member 29 engaging a flexible tube 25 into which product is extruded from a container. However, in this case the container is different from the container 12 of the previous embodiment and is shown at 50 in FIG. 12. It is generally cylindrical and collapsible having an outlet nozzle 51 extending from one end in the lateral direction. The container 50 is for location within a cylinder 52 having a piston 53 at one end moveable along the cylinder towards the other end to compress the container 50 and cause it to reduce in volume, discharging product from the container under such pressure through the outlet 51. In this case the piston 53 is moved by a linkage 54, generally termed scissors or a lazy tongs linkage which is moved towards an expanded position, FIG. 11, by a drive arrangement 55 having a rod 56 one end of which is attached to the linkage 54 whereby upon retraction of the rod 56 the linkage 54 is expanded to move the piston along the cylinder 52. In the operating position of FIG. 11 the end of the cylinder 52 is closed by an abutment member 58 against which the container 50 is engaged. The nozzle 51 extends through a side opening in the cylinder 52 to lie in sealing engagement with the tube 25. The linkage 54 is used to allow the dimensions between the front and back of the apparatus to be kept to a minimum.

The cylinder 52 is pivotable about a pivot 60 by operation of a drive 62 which moves the end of the cylinder remote from the outlet up and down whereby to expose the container 50 (FIG. 12) from the abutment 58 and allow access to the container 50 whereby to enable the container to be removed from the cylinder 52 when empty, and for full containers 50 to be located within the cylinder 52, when required. The container 50 is generally formed of flexible plastics material to enable it to collapse as product is discharged therefrom. In another arrangement the container is discharged by a piston within the container.

Referring now to FIGS. 13A and 13B there is shown two forms of container similar to that shown FIGS. 1-4, the container of FIG. 13A having a single outlet nozzle 39 located centrally of the base 14 of the container, the nozzle 39 tapering inwardly away from the container. The base 14 is of generally circular section and has a curved profile and extends upwardly to define a shoulder 65 and then an outwardly tapering upper portion 66 terminating in a lip 67. The container has an upper closure member 15 of which the central portion 15A is deformable and invertible to move downwardly into the curvilinear portion of the base 14 so that when the container is discharged fully the portion 15A lies closely adjacent the base 14. The outer part of the closure 15 has an upwardly directed portion 68 whose upper edge extends over the lip 67 to secure the closure 15 on the base 14 by mechanically locking. If desired the closure 15 and the base 14 are secured together by heat-sealing. This may be done after the container has been filled with product. Alternatively the closure 15 may be sealed on the base 14 before admitting product to the container in which case product is admitted to the container through the nozzle 39.

Other shapes of container can also be employed, for example, rectangular with radiused corners.

The container of FIG. 13B is similar to that of FIG. 13A except that in this case two outlet nozzles 39 are formed in the base 14. The twin nozzle arrangement permits apparatus to be employed in which there are two discharge paths for product from the container, as shown in FIGS. 14A and 14B. Thus, if required two receptacles can be filled at the same time from the same container at the same or different rates and with the same or different quantities of product in each receptacle. The apparatus of FIGS. 14A and 14B may in other respects be similar to the apparatus of FIGS. 1-4 except two sets of valves and discharge members are provided, one for each path of product.

Sauces or other additional product can be dispensed at the outlet area, for example, using a liquid pump, with the possibility of a different sauce for each outlet.

Referring now to FIG. 15, there is shown apparatus in which two containers 12 may be employed at the same time, there being two plungers 21, one for each container, and one or two discharge paths from the two containers. If there is one discharge path then one container provides a back up for the container which is being used. If two discharge paths are provided, there may be two discharge operations which can be effected simultaneously and each container may contain different product.

In the arrangement with one discharge path there is provided a three way manifold valve 69 by which supply may be switched from one or other of the containers 12, when one becomes empty, and the operation may be automatic. The front of the housing 10 is provided with doors 68 one for each side of the housing to access one or other of the individual dispensers. Dispensing may continue when the container at one side is being changed. A central division is provided between the two dispensers to prevent access to the working parts of the operational dispenser during refilling.

Referring now to FIG. 16 there is shown an arrangement for use on the apparatus of FIGS. 1-4 whereby the discharge plunger may be moved and put to one side of the container, or to the back or front of the container, between operative movements of the plunger 21. Thus as the plunger 21 is moved upwardly from engagement from the container 12 it moves along a cam track 70 having two portions 70A and 70B of which portion 70A lies along the axis of compressive movement of the plunger and portion 70B is inclined thereto. The drive means 23 is pivotally attached at 24 so that as the plunger moves upwards a pin 71 carried on the rod 22 passes upwards along the portion 70A and then side ways along the portion 70B of the track, the drive 23 pivoting to one side. In the latter position, the plunger has moved to give more ready access to an empty container 12 which can then be released from the seating 13 and a full container replaces the empty one, access being obtained to the container through a door in the front of the housing 10.

Referring to FIG. 17 a similar requirement is met by the drive 23 being displaceable about axis 24 to give access to the empty container 12, this time through a rear door 74 into the housing 10.

FIG. 18 shows the drive 23 displaced rearwards, for example, by the arrangement of FIG. 16 to give access to recharging the container 12.

Referring now to FIGS. 19A and 19B, there is shown an arrangement by which overload, or maximum selected load, in the drive 23 is detected by a simple mechanical arrangement. As shown, the drive 23 is carried on a pivot 24 carried on a rod 75. The rod 75 in turn carries an arm 76 moveable between lower and upper switches 77 and 78. A fixed abutment plate 79 is located on the rod 75 and a domed spring 80 extends between the fixed member 79 and the lower end of the rod 75. Normally the spring 80 is fully extended and the arm 76 engages with the switch 77. If the pressure in the drive 23 exceeds a predetermined high value, the pressure overcomes the resistance of the spring 80 and the rod 75 with the arm 76 moves upwards so that the arm 76 engages with the switch 78 and tells the drive that too much, or the selected pressure is being applied and switches off the drive. This situation may arise if the drive has reached the end of its travel and the container is empty. Alternatively, if the product within the container is too hard to extrude, then the drive signals this fact and interrupts the drive arrangement. FIG. 19B shows the drive and associated spring 80 when drive pressure has been exceeded.

Referring now to FIGS. 20A-20C, there is shown a further drive overload arrangement similar to that of FIGS. 19A and 19B having a drive 82 and rod 83, the drive 82 being connected at one end to a further rod 84 about which are located springs 85 and 86, one to each side of a fixed abutment 87, there being an arm 88 extending from the rod 84 and the arm being engageable with switches 89 and 90.

Thus, on extension of the drive 82 in one direction with a force sufficient to exceed a predetermined pressure, the spring 85 will compress and cause the switch 90 to be operated. In the other direction, the spring 86 will be compressed and cause the switch 89 to be operated. This arrangement is for particular application to the apparatus of FIGS. 11 and 12.

Referring now to FIGS. 21A, 21B and 21C there is shown a further arrangement for detecting pressure overload. This is similar to those in the previous embodiments except that in this case the rod 75 has located around it two domed springs 92 and 93, in series, which are arranged to operate at different pressures so that upon the force applied exceeding a first predetermined value, one spring 92 is compressed and at a higher predetermined pressure, spring 93 is compressed. This causes the arm 76 to operate a series of three switches 94, 95 and 96 in sequence, thereby enabling control of the operation of the drive within three pressure parameters. More than two sets of springs can be used to give more pressure parameters.

FIG. 22 shows the incorporation of the drive overload system of FIGS. 19A and 19B in to apparatus similar to that of FIGS. 1-4 except that in this case, the tube 25 has a simple cut off valve 97 which, when open, permits discharge of product through nozzle 26 and, when closed, prevents discharge of product from the container 12. There is then no control of individual portions in the manner of the previous embodiment. The valve 97 simply controls the flow from the container on an off/on basis. However, there may be control of the time the valve 97 is operated thereby controlling the amount of product dispensed by preselection.

The overload arrangement functions to tell the operator when a container has emptied or when product within the container is too hard to be discharged. It can be confirmed whether the container is empty by linking the signal to the main drive to determine 'empty' as opposed to 'too hard'. A light signal can then be used as an indication.

Instead of using linear or mechanical drives for the discharge of the container contents and operation of the valve and tube discharge other drive means may be employed, for example, pneumatically hydraulically on other drive media. The use of linear drives which operate at constant speeds enables the apparatus to be controlled by the position of the moveable terms and in accordance with the time for which the drives have been operating which eases the control of the apparatus. However, proximity switches can be used to detect when various operations can be performed.

The housing 10 is refrigerated to retain product in the container at the desired dispensing temperature. However if containers are stored in the housing and introduced at lower than dispensing temperature this will have the effect of lowering the temperature in the housing. Accordingly, the housing may have heater means as well as cooling means to heat up the internal space as well as to keep the product and the air within the housing at the required low temperature. Alternatively stored containers may be held in a compartment separate from the main body of the housing in which compartment heating can take place to raise the temperature of the product to a dispensing temperature. It is also helpful to have ventilation/circulating air within the housing. It may also be helpful to be able to select the temperature within the housing or part thereof according to the product to be dispensed when different products have different dispensing temperatures.

The invention claimed is:

1. A method of dispensing semi-solid product by extrusion from a container of product, comprising:
   (a) applying pressure to the exterior of the container of product to cause the product to be discharged by extrusion through a container outlet from the container into a flexible tube;
   (b) controlling the flow of product from the container outlet through the flexible tube to an outlet nozzle, wherein controlling the flow of product comprises using a first inlet valve between the container outlet and the flexible tube and a second outlet valve between the flexible tube and the outlet nozzle; and
   (c) compressing the flexible tube using a drive means to express product from the flexible tube towards the outlet nozzle.

2. The method according to claim 1, wherein the first valve is opened to admit product into the flexible tube with the second valve closed, the first valve is then closed and the second valve opened, and the drive means is then operated to compress the flexible tube and express product in the flexible tube through said outlet nozzle downstream of the second valve.

3. The method according to claim 1, wherein operation of the drive means is controlled to express a predetermined portion of the product in the flexible tube through the nozzle, the size of the portion being adjustable to range between all the product in the flexible tube and a proportion of the product in the flexible tube.

4. The method according claim 1, wherein the drive means includes a tube engagement means which is movable reciprocally towards and away from the flexible tube to compress the flexible tube.

5. The method according to claim 1, wherein the first and second valves are spaced along the flexible tube to open and close the flexible tube by reciprocal movement to engage, deform and close the flexible tube at said spaced locations.

6. The method according to claim 1, wherein the container outlet is releasably connected to the flexible tube, the flexible tube extending towards the outlet nozzle which is shaped to shape a product discharged therethrough.

7. The method according to claim 1, wherein the drive means includes a tube engagement means moveable along the flexible tube towards the outlet nozzle to discharge the flexible tube contents.

8. The method according to claim 1, wherein the container and the flexible tube are contained within a refrigerated environment, the outlet nozzle projecting outwards from said environment.

9. The method according to claim 7, wherein the tube engagement means includes a roller which engages the flexible tube towards one end thereof and moves towards the outlet nozzle after said engagement.

10. An apparatus for dispensing semi-solid product, comprising:
    (a) a product container, the container having an outlet;
    (b) a pressurizing means for applying pressure to the exterior of the container to thereby extrude product from the outlet;
    (c) a flexible tube comprising a first end and a second end, the first end communicating with the outlet of the container and the second end communicating with a nozzle;
    (d) a drive means for engaging the flexible tube to deform the flexible tube and cause product in the flexible tube to be discharged through the nozzle; and
    (e) a valve means for controlling the flow of product from the nozzle, the valve means comprising a first valve adjacent to the nozzle, wherein the first valve controls the flow of product from the flexible tube to the nozzle, and a second valve between the outlet and the flexible tube to control flow of product to the flexible tube.

11. The apparatus according to claim 10, wherein the drive means includes a reciprocal drive member arranged to engage the flexible tube to deform and flatten the flexible tube to cause product in the flexible tube to be discharged from the nozzle.

12. The apparatus according to claim 10, wherein the outlet and the flexible tube are releasably connected to one another and the flexible tube is removable from the apparatus for replacement and/or sanitizing.

13. The apparatus according to claim 11, wherein the reciprocal drive member is moveable along the flexible tube towards said nozzle after engaging the flexible tube.

14. The apparatus according to claim 10, wherein the container and the flexible tube are located in a refrigerated housing to keep the product frozen, the nozzle projecting outwardly from the housing.

15. A method of dispensing semi-solid product by extrusion from a container of product, comprising:
(a) applying pressure to the exterior of the container of product to cause the product to be discharged by extrusion through a container outlet from the container into a flexible tube;
(b) controlling the flow of product from the container outlet through the flexible tube to an outlet nozzle; and
(c) compressing the flexible tube using a drive means to express product from the flexible tube towards the outlet nozzle;
wherein the container outlet is releasably connected to the flexible tube, the flexible tube extending towards the outlet nozzle which is shaped to shape a product discharged therethrough.

16. A method of dispensing semi-solid product by extrusion from a container of product, comprising:
(a) applying pressure to the exterior of the container of product to cause the product to be discharged by extrusion through a container outlet from the container into a flexible tube;
(b) controlling the flow of product from the container outlet through the flexible tube to an outlet nozzle; and
(c) compressing the flexible tube using a drive means to express product from the flexible tube towards the outlet nozzle, wherein the drive means includes a tube engagement means movable along the flexible tube towards the outlet nozzle to discharge the flexible tube contents.

17. An apparatus for dispensing semi-solid product, comprising:
(a) a product container, the container having an outlet;
(b) a pressurizing means for applying pressure to the exterior of the container to thereby extrude product from the outlet;
(c) a flexible tube comprising a first end and a second end, the first end communicating with the outlet of the container and the second end communicating with a nozzle;
(d) a drive means for engaging the flexible tube to deform the flexible tube and cause product in the flexible tube to be discharged through the nozzle; and
(e) a valve means for controlling the flow of product from the nozzle;
wherein the outlet and the flexible tube are releasably connected to one another and the flexible tube is removable from the apparatus for replacement and/or sanitizing.

\* \* \* \* \*